(12) United States Patent
Stephens et al.

(10) Patent No.: US 8,074,684 B2
(45) Date of Patent: Dec. 13, 2011

(54) SEAT HEIGHT CONTROL SYSTEM

(75) Inventors: Charles Stephens, Seattle King, WA (US); John Michael Morris, Auburn, WA (US)

(73) Assignee: Norgren GT Development Corporation, Auburn, WA (US)

( * ) Notice: Subject to any disclaimer, the term of this patent is extended or adjusted under 35 U.S.C. 154(b) by 1092 days.

(21) Appl. No.: 11/871,522

(22) Filed: Oct. 12, 2007

(65) Prior Publication Data

US 2009/0096268 A1    Apr. 16, 2009

(51) Int. Cl.
 *F16K 11/074* (2006.01)
 *F15B 13/044* (2006.01)
(52) U.S. Cl. ..................... 137/625.21; 251/58
(58) Field of Classification Search ............. 137/625.21, 137/625.22, 625.24; 251/58; 297/344.16, 297/344.19
 See application file for complete search history.

(56) References Cited

U.S. PATENT DOCUMENTS

| | | | |
|---|---|---|---|
| 1,177,968 A * | 4/1916 | Smith ................. | 137/625.22 |
| 2,354,694 A * | 8/1944 | McGill ................ | 137/625.23 |
| 3,216,326 A * | 11/1965 | Pridham, Jr. et al. .... | 137/625.21 |
| 3,218,020 A * | 11/1965 | Rhodes ................ | 248/550 |
| 3,237,529 A * | 3/1966 | Beck et al. ........... | 137/625.21 |
| 3,315,934 A * | 4/1967 | Taylor ................ | 248/550 |
| 4,213,594 A | 7/1980 | Pietsch et al. | |
| 4,382,573 A | 5/1983 | Aondetto | |
| 4,461,444 A | 7/1984 | Grassl et al. | |
| 4,470,632 A | 9/1984 | Babbs | |
| 4,538,854 A | 9/1985 | Wilson | |
| 4,573,657 A | 3/1986 | Sakamoto | |
| 4,638,982 A | 1/1987 | Misher et al. | |
| 4,645,169 A | 2/1987 | Mischer | |
| 4,659,052 A | 4/1987 | Nagata | |
| 4,684,100 A | 8/1987 | Grassl | |
| 4,729,539 A | 3/1988 | Nagata | |
| 4,733,847 A | 3/1988 | Grassl | |
| 4,941,641 A | 7/1990 | Granzow et al. | |
| 4,965,899 A | 10/1990 | Sekido et al. | |
| 5,058,852 A | 10/1991 | Meier et al. | |
| 5,082,326 A | 1/1992 | Sekido et al. | |
| 5,092,197 A | 3/1992 | Hauger | |
| 5,176,355 A | 1/1993 | Carter | |
| 5,346,170 A | 9/1994 | Schmidt et al. | |
| 5,528,959 A | 6/1996 | Yamakami | |

(Continued)

FOREIGN PATENT DOCUMENTS

EP    232685 B1    1/1989
GB    2168893 A    7/1986

*Primary Examiner* — John Rivell
(74) *Attorney, Agent, or Firm* — The Ollila Law Group LLC

(57) ABSTRACT

The present invention relates to a leveling valve including a first port, a second port, a third port, a valve, and a clutch. The clutch is provided with an engaged position and a disengaged position. At least a portion of the clutch may move relative to the valve when the clutch is in the disengaged position. The clutch moves the valve when the clutch is in the engaged position. The valve is movable between a first position, a second position, and a third position. When the valve is in the first position, the valve blocks a first pathway, which extends from the first port, from connecting with a second pathway, which extends from the second port. When the valve is in the second position, the valve allows the first pathway to connect with the second pathway. When the valve is in the third position, the valve allows the second pathway to connect with a third pathway, which extends from the third port.

12 Claims, 17 Drawing Sheets

U.S. PATENT DOCUMENTS

| | | |
|---|---|---|
| 5,882,075 A | 3/1999 | Partington et al. |
| 6,119,727 A | 9/2000 | Morris |
| 6,264,163 B1 | 7/2001 | Ivarsson |
| 2006/1027880 | 12/2006 | Haller |

* cited by examiner

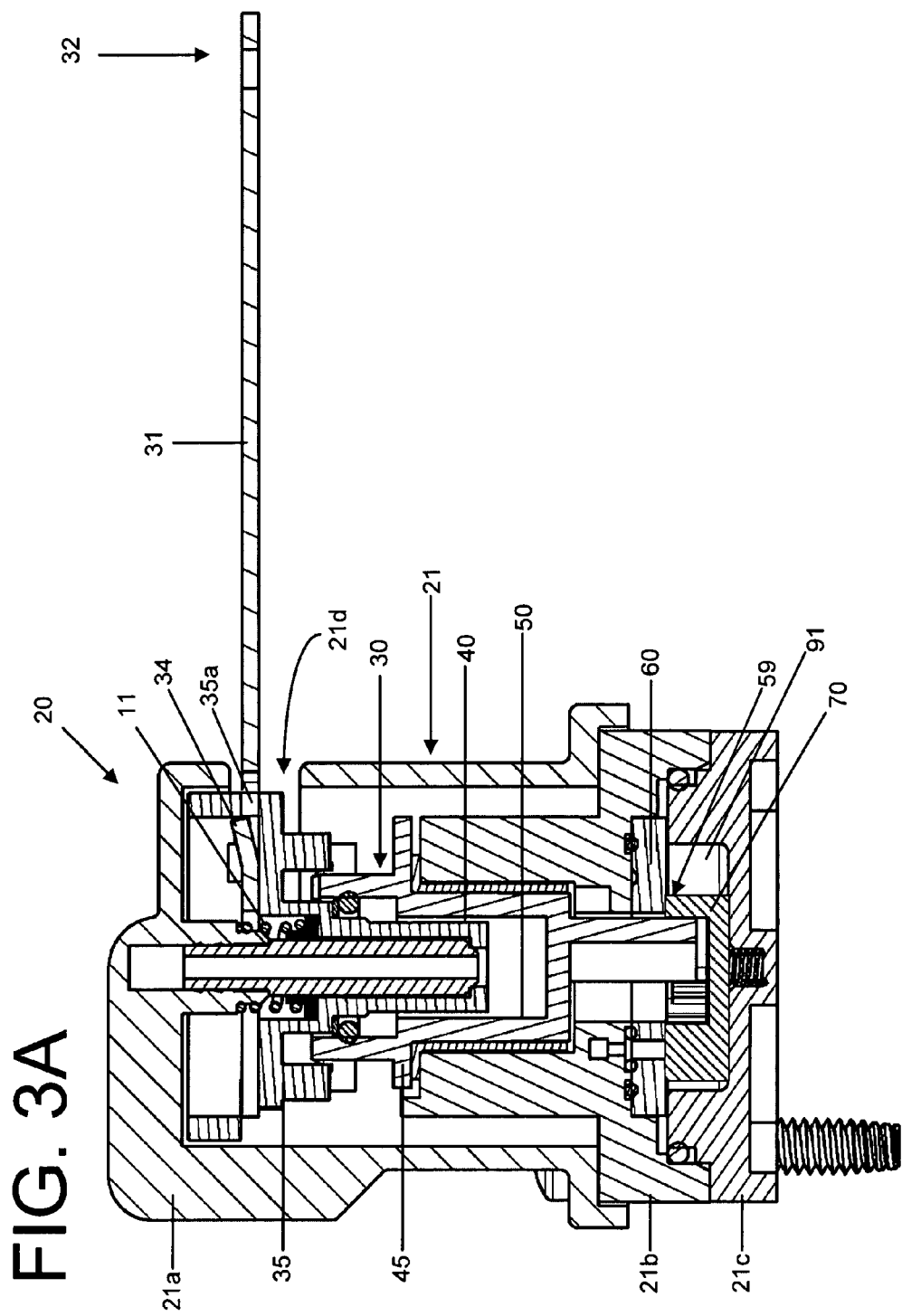

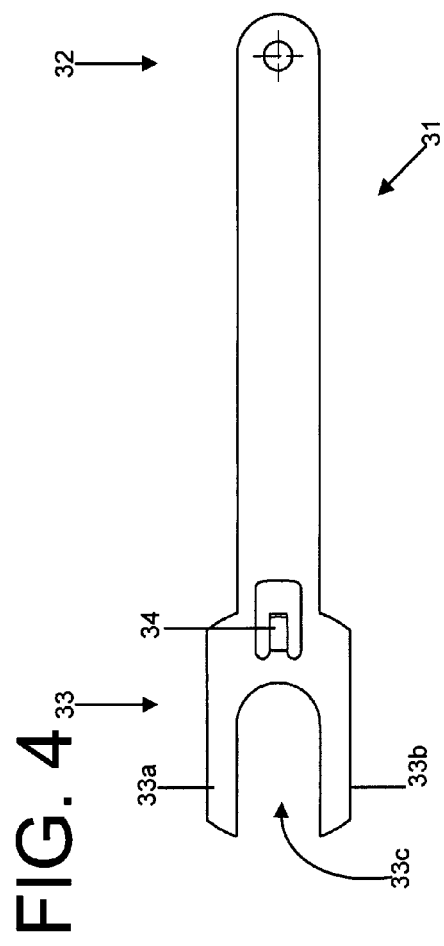
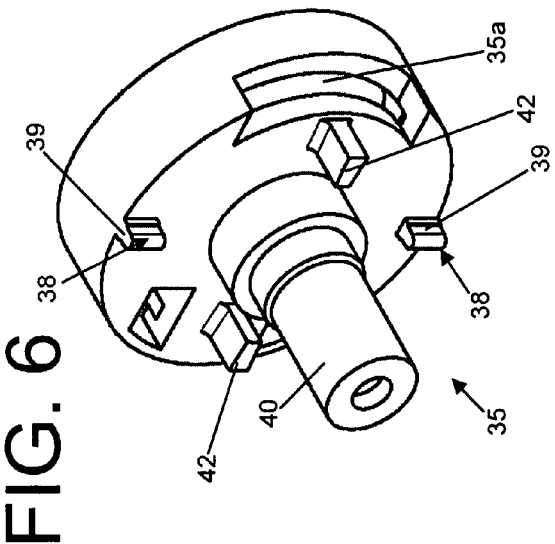
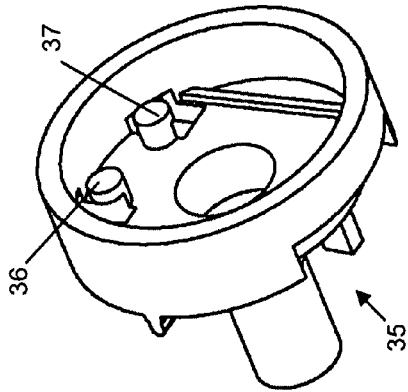

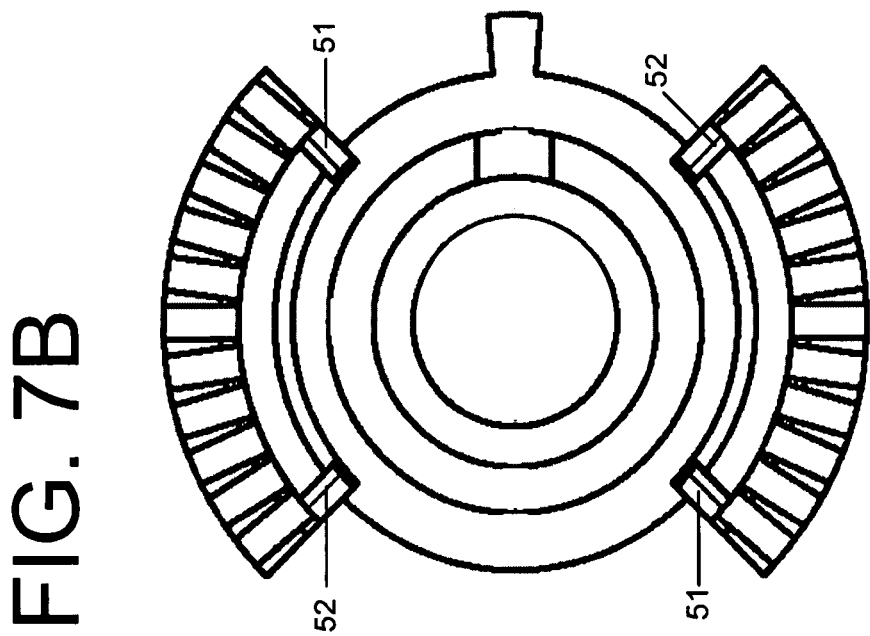
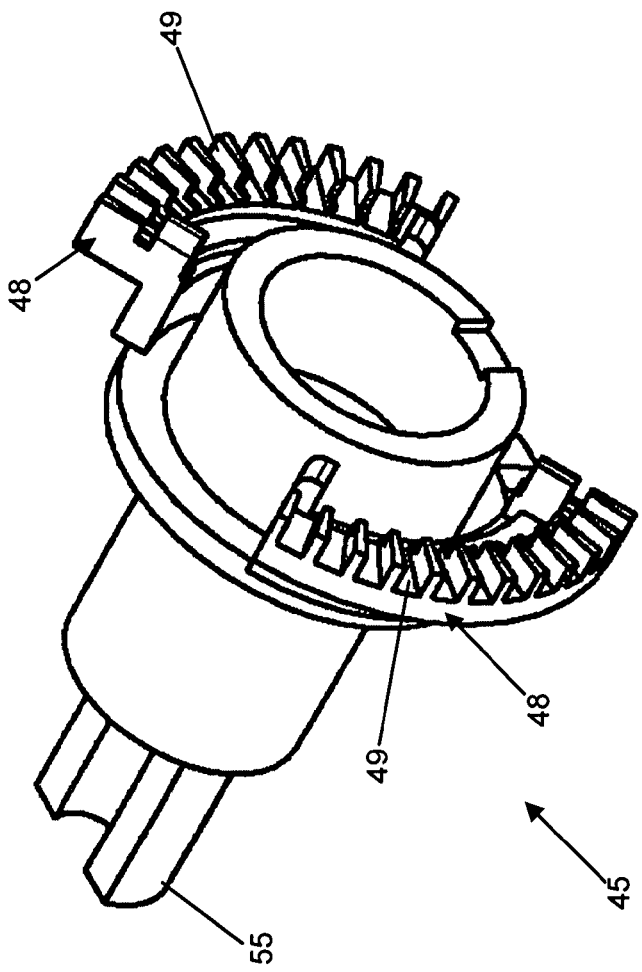
FIG. 7B
FIG. 7A

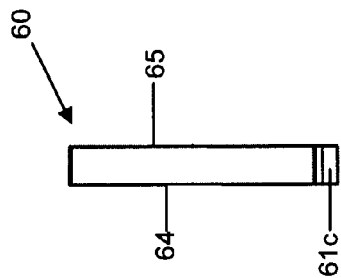
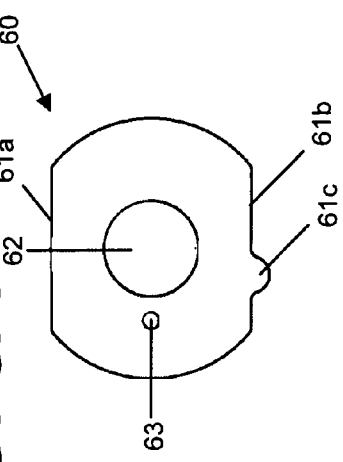
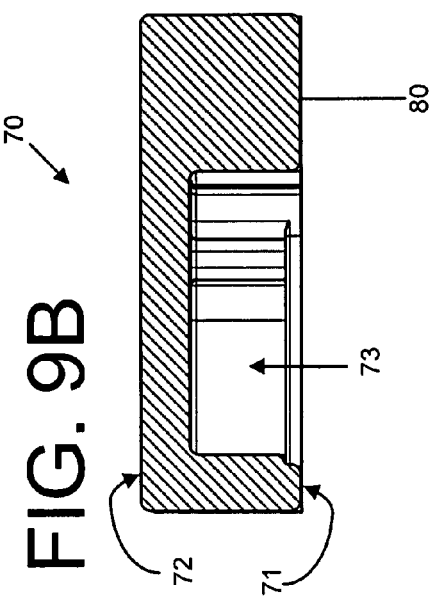
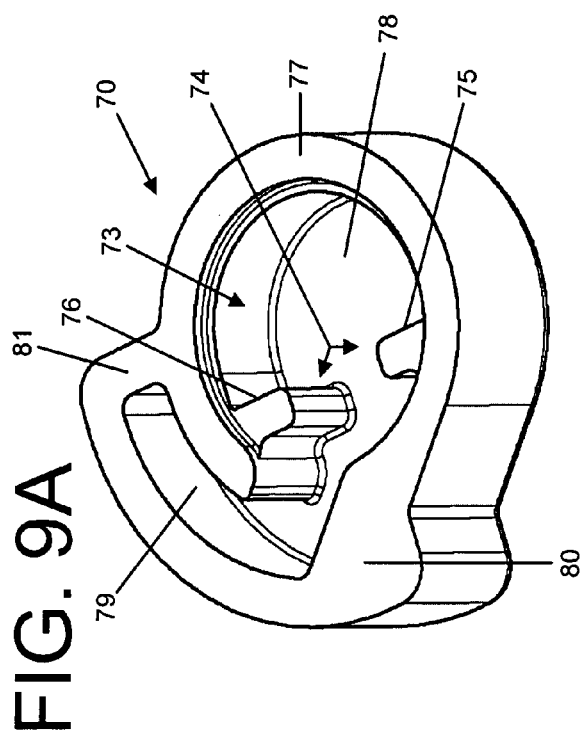

FIRST POSITION

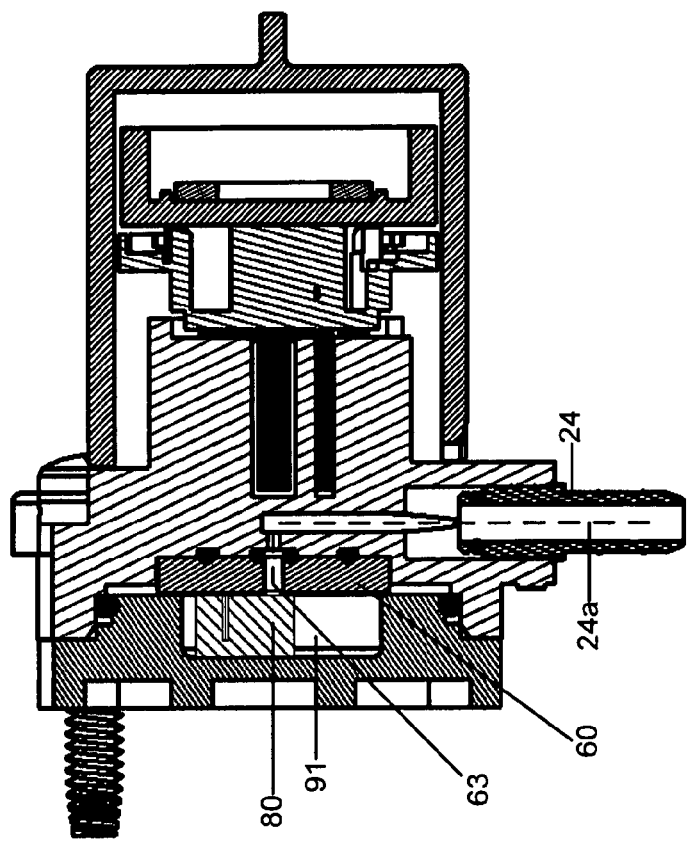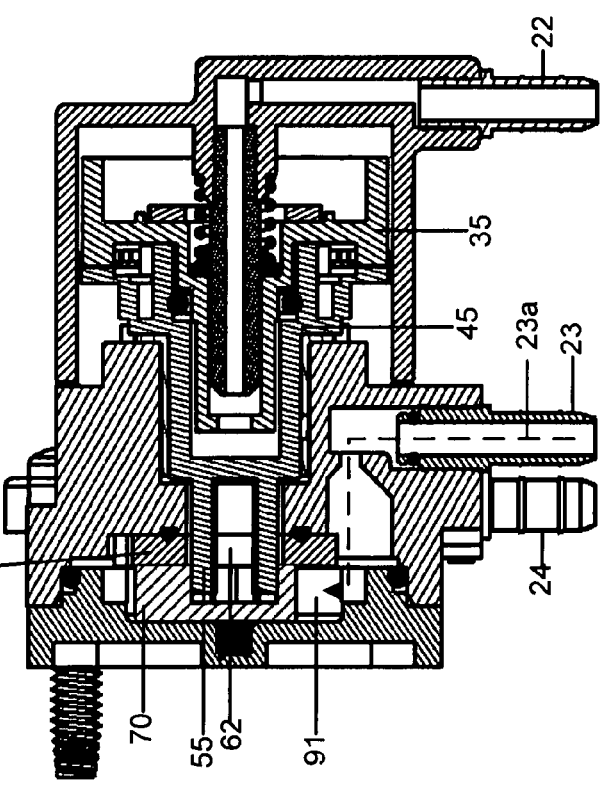

SECOND POSITION

THIRD POSITION

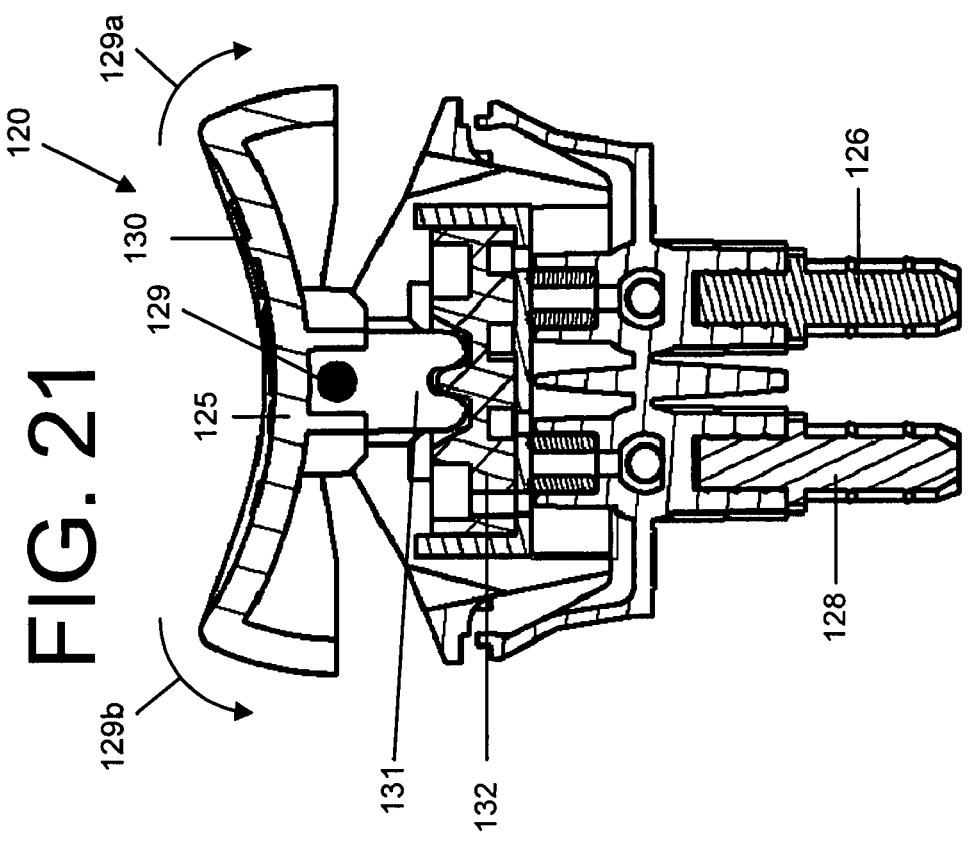
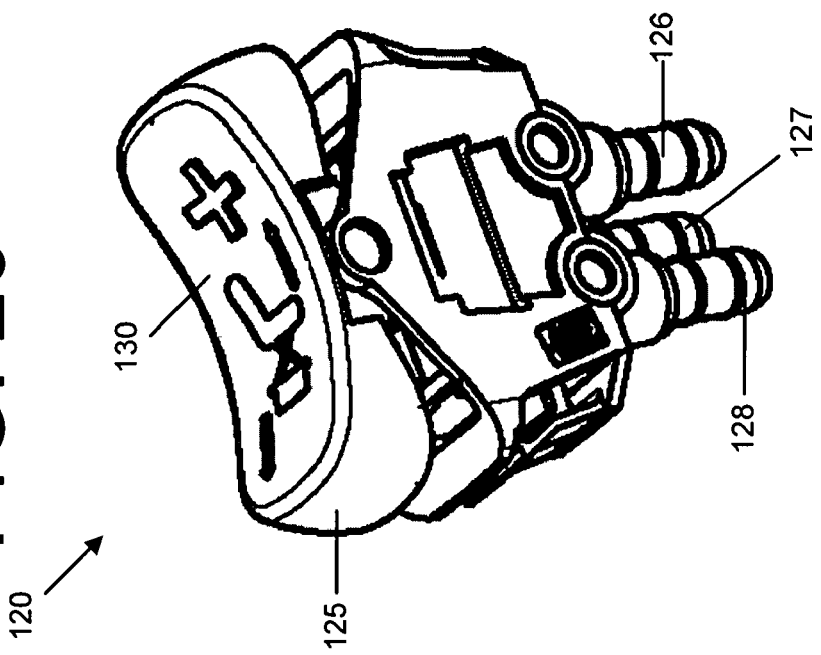

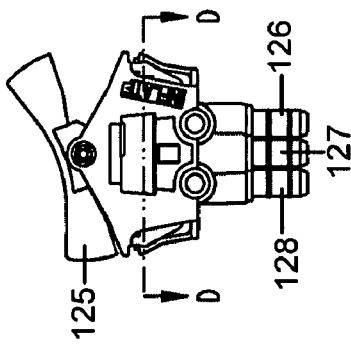
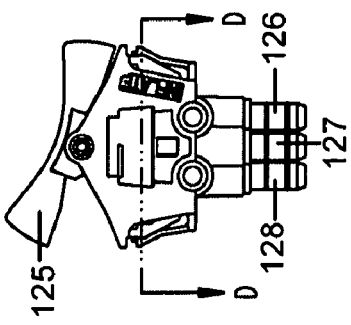
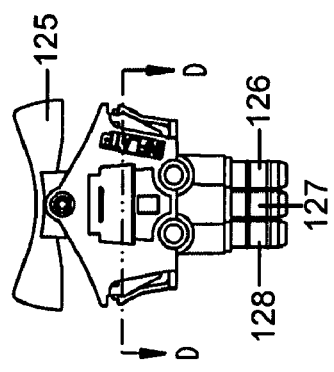
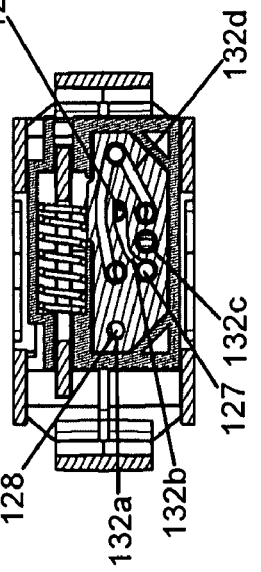
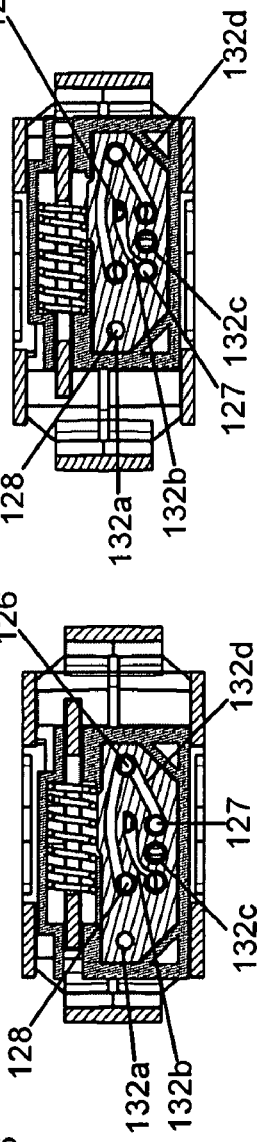
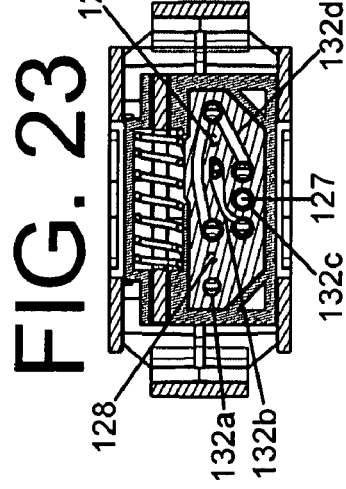

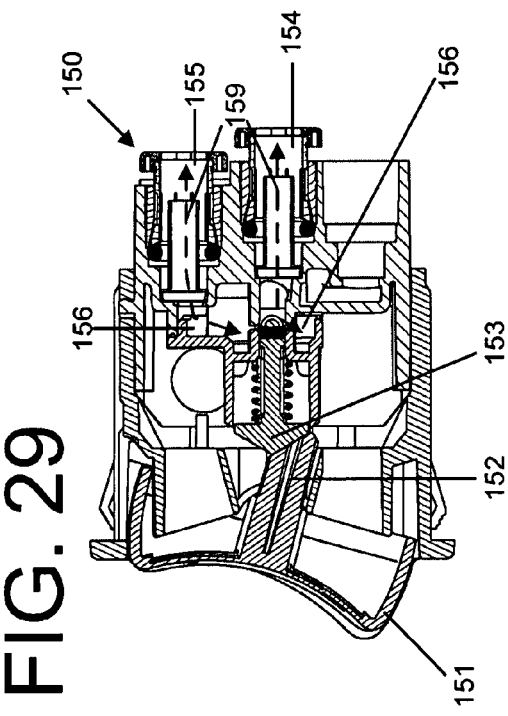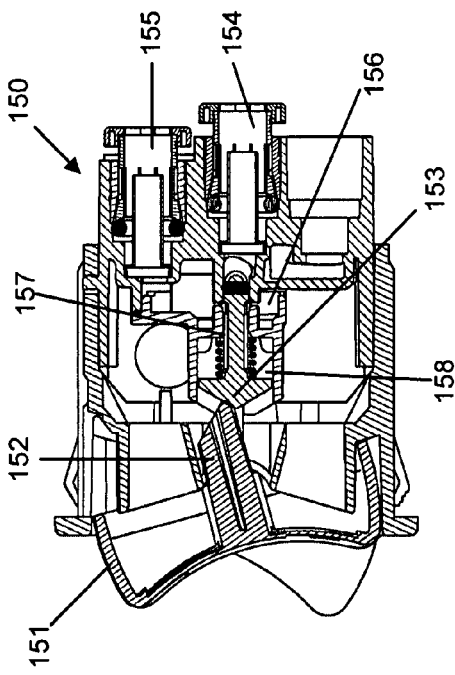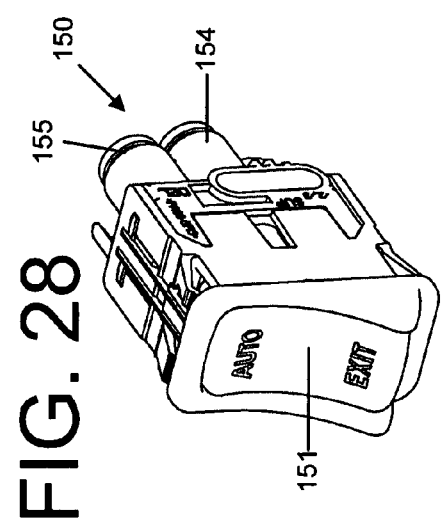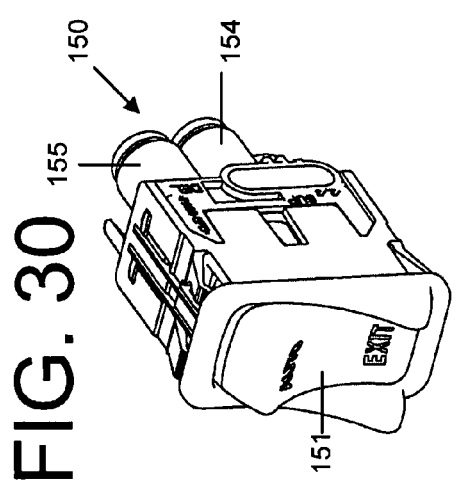

SEAT HEIGHT CONTROL SYSTEM

FIELD OF THE INVENTION

The present invention relates to a seat height control system, and, particularly, to a seat height control system for a vehicle seat.

BACKGROUND OF THE INVENTION

Seats, such as, for example, vehicle seats in trucks, are often times supported by an air bladder. In such an arrangement, the air bladder acts as a suspension system for the seat and the height of the seat may be determined by the amount of pressurized air in a bladder. Pressurized air may be introduced into the bladder to increase the height of the seat. Similarly, pressurized air may be removed from the bladder to decrease the height of the seat. The present invention is directed at providing a leveling valve that maintains a generally constant seat height in such a system when a clutch of the leveling valve is engaged. The present invention is directed at providing a leveling valve that allows the height of the seat to be adjusted when the clutch of the leveling valve is disengaged. Other preferred aspects of the present invention are set forth below.

SUMMARY OF THE INVENTION

The scope of the present invention is defined solely by the appended claims, and is not affected to any degree by the statements within this summary.

In one embodiment of the present invention, a leveling valve includes a first port, a second port, a third port, a valve, and a clutch. The clutch is provided with an engaged position and a disengaged position. At least a portion of the clutch may move relative to the valve when the clutch is in the disengaged position. The clutch moves the valve when the clutch is in the engaged position. The valve is movable between a first position, a second position, and a third position. When the valve is in the first position, the valve blocks a first pathway, which extends from the first port, from connecting with a second pathway, which extends from the second port. When the valve is in the second position, the valve allows the first pathway to connect with the second pathway. When the valve is in the third position, the valve allows the second pathway to connect with a third pathway, which extends from the third port.

In another embodiment of the present invention, a leveling valve includes a first port from which a first pathway extends, a second port from which a second pathway extends, a third port from which a third pathway extends, a valve, and a clutch. The clutch is provided with a clutch arm, a first clutch member, and a second clutch member. The clutch arm is connected to the first clutch member and moves the first clutch member when the clutch is in an engaged position and a disengaged position. The first clutch member moves the second clutch member when the clutch is in the engaged position. The first clutch member may move relative to the second clutch member when the clutch is in the disengaged position. The second clutch member moves the valve between a first position, a second position, and a third position when the first clutch member moves the second clutch member. When the valve is in the first position, the valve blocks the first pathway from connecting with the second pathway. When the valve is in the second position, the valve allows the first pathway to connect with the second pathway. When the valve is in the third position, the valve allows the second pathway to connect with the third pathway.

In yet another embodiment of the present invention, a seat height control system, includes at least one air bladder, a leveling valve, and one or more valves. The leveling valve includes a clutch that is provided with an engaged position and a disengaged position. When the clutch is in an engaged position, the leveling valve selectively introduces pressurized air to the air bladder, relieves pressurized air from the air bladder, or neither adds nor relieves pressurized air from the air bladder. The one or more valves deliver pressurized air to the leveling valve to disengage the clutch of the leveling valve and selectively introduce pressurized air to the air bladder, relieve pressurized air from the air bladder when the clutch of the leveling valve is disengaged, or neither add pressurized air to the air bladder nor relieve pressurized air from the air bladder.

BRIEF DESCRIPTION OF THE DRAWINGS

FIG. 3A shows a sectional view of the leveling valve of an embodiment of the present invention.

FIG. 4 shows a perspective view of a clutch arm of an embodiment of the leveling valve.

FIG. 5 shows a perspective view of a first clutch member of an embodiment of the leveling valve.

FIG. 6 shows a perspective view of a first clutch member of an embodiment of the leveling valve.

FIG. 7A shows a perspective view of a second clutch member of an embodiment of the leveling valve.

FIG. 7B shows a perspective view of a second clutch member of an embodiment of the leveling valve.

FIG. 8A shows a perspective view of a valve plate of an embodiment of the leveling valve.

FIG. 8B shows a perspective view of a valve plate of an embodiment of the leveling valve.

FIG. 9A shows a perspective view of a valve of an embodiment of the leveling valve.

FIG. 9B shows a sectional view of a valve of an embodiment of the leveling valve.

FIG. 11 shows a sectional view taken along line B1 of FIG. 10 of an embodiment of the leveling valve.

FIG. 12 shows a sectional view taken along line B2 of FIG. 10 of an embodiment of the leveling valve.

FIG. 20 shows a perspective view of an embodiment of a height adjusting valve.

FIG. 21 shows a sectional view of an embodiment of a height adjusting valve.

FIG. 22 shows a perspective view of an embodiment of a height adjusting valve.

FIG. 23 shows a sectional view taken along line D in FIG. 22 of an embodiment of a height adjusting valve.

FIG. 24 shows a perspective view of an embodiment of a height adjusting valve.

FIG. 25 shows a sectional view taken along line D in FIG. 24 of an embodiment of a height adjusting valve.

FIG. 26 shows a perspective view of an embodiment of a height adjusting valve.

FIG. 27 shows a sectional view taken along line D in FIG. 26 of an embodiment of a height adjusting valve.

FIG. 28 shows a perspective view of an embodiment of an exit valve.

FIG. 29 shows a sectional view of an embodiment of an exit valve.

FIG. 30 shows a perspective view of an embodiment of an exit valve.

FIG. 31 shows a sectional view of an embodiment of an exit valve.

DETAILED DESCRIPTION OF THE INVENTION

Figure 1:
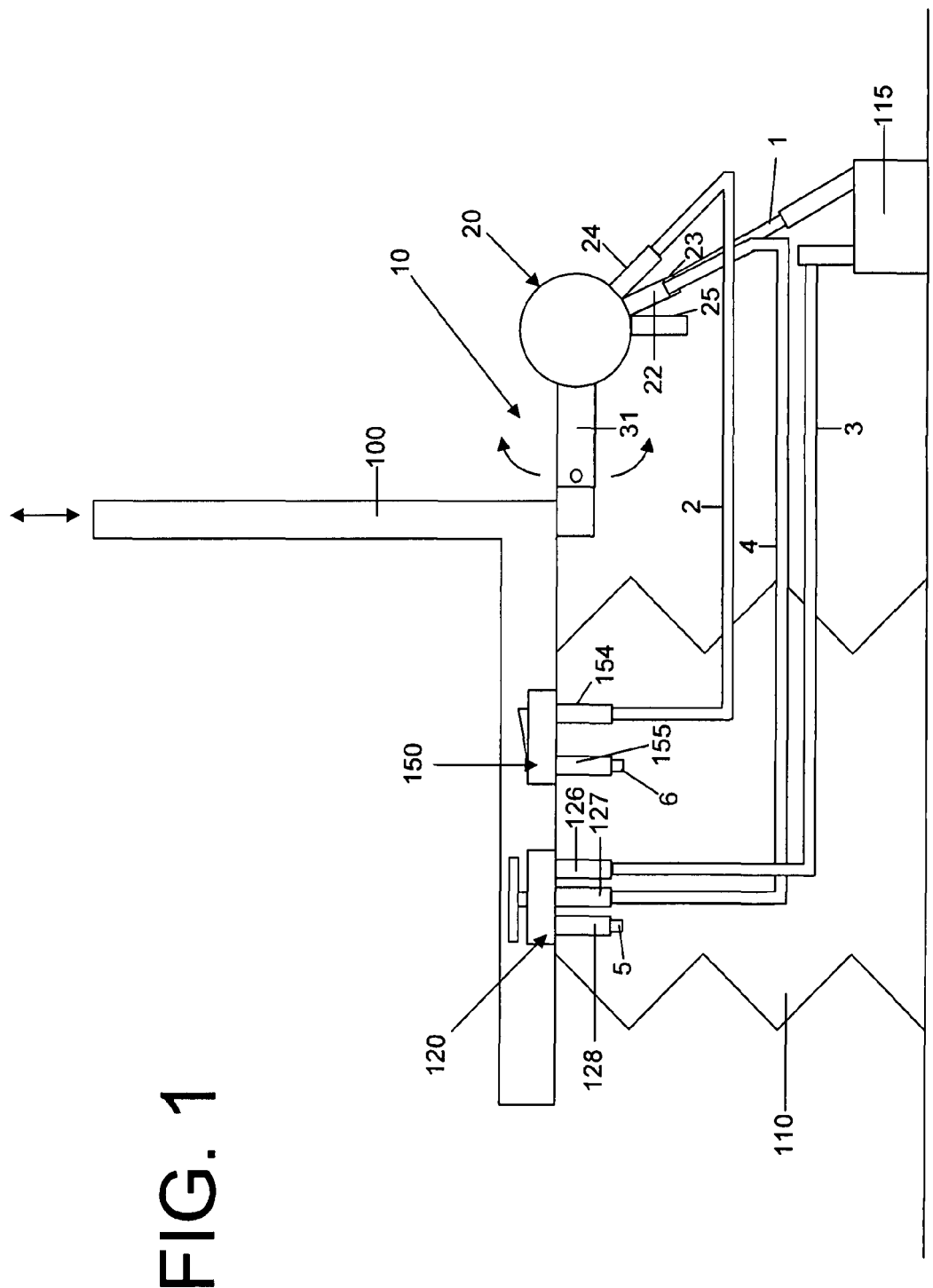
FIG. 1 depicts a seat height control system of an embodiment of the present invention.

FIG. 1 depicts a seat height control system 10 according to an embodiment of the present invention. As shown therein, the seat height control system 10 is preferably provided with a leveling valve 20, a height adjusting valve 120, and an exit valve 150. The seat height control system 10 is configured to control the height of a seat 100 that is supported at least in part by an air bladder 110.

As shown in FIG. 1, the leveling valve 20 is connected to a seat 100 by a clutch arm 31. The leveling valve 20 is configured to maintain the seat 100 at a generally constant height when a clutch 30 (shown in FIG. 3A) of the leveling valve 20 is engaged. The height maintained corresponds to the height at which the seat 100 was at when the clutch 30 was engaged. Thereafter, when the height of the seat 100 changes while the clutch 30 is engaged, the clutch arm 31 rotates the clutch 30, which rotates a valve 70 (shown in FIGS. 3A and 3B) in the leveling valve 20. Depending on the direction of rotation of the valve, the leveling valve 20 will cause pressurized air to be delivered to the air bladder 110 or pressurized air to be relieved from the air bladder 110 in order to return the seat 100 to the height at which the seat 100 was at when the clutch 30 was engaged.

The height adjusting valve 120 is configured to allow the height of the seat 100 to be adjusted. In order to prevent the leveling valve 20 from interfering with the height adjustment of the seat 100, the height adjusting valve 120 is configured to deliver pressurized air to the leveling valve 20 in order to disengage the clutch 30 of the leveling valve 20. While the clutch 30 of the leveling valve 20 is disengaged, the height of the seat 100 may be adjusted. The height adjusting valve 120 adjusts the height of the seat 100 by supplying pressurized air to the air bladder 110 or relieving pressurized air from the air bladder 110. When adjustment of the height of the seat is complete, the pressurized air supplied to the leveling valve 20 to disengage the clutch 30 is relieved and the clutch 30 engages. Thereafter, the leveling valve 20 will maintain the seat 100 at this new height until the clutch 30 is once again disengaged by the height adjusting valve 120 or until the exit valve 150 is used to rapidly deflate the air bladder 110, as subsequently discussed.

The exit valve 150 is configured to rapidly deflate the air bladder 110 of the seat 100. In order to prevent the leveling valve 20 from interfering with rapid deflation of the air bladder 110, the exit valve 150 blocks the leveling valve 20 from delivering pressurized air to the air bladder 110 while the exit valve 150 deflates the air bladder 110. Once it is desired to re-inflate the bladder and return the seat 100 to the height at which it was at prior to the rapid deflation of the air bladder 110 by the exit valve 150, the exit valve allows the leveling valve 20 to deliver pressurized air to the air bladder 110.

Figure 2:
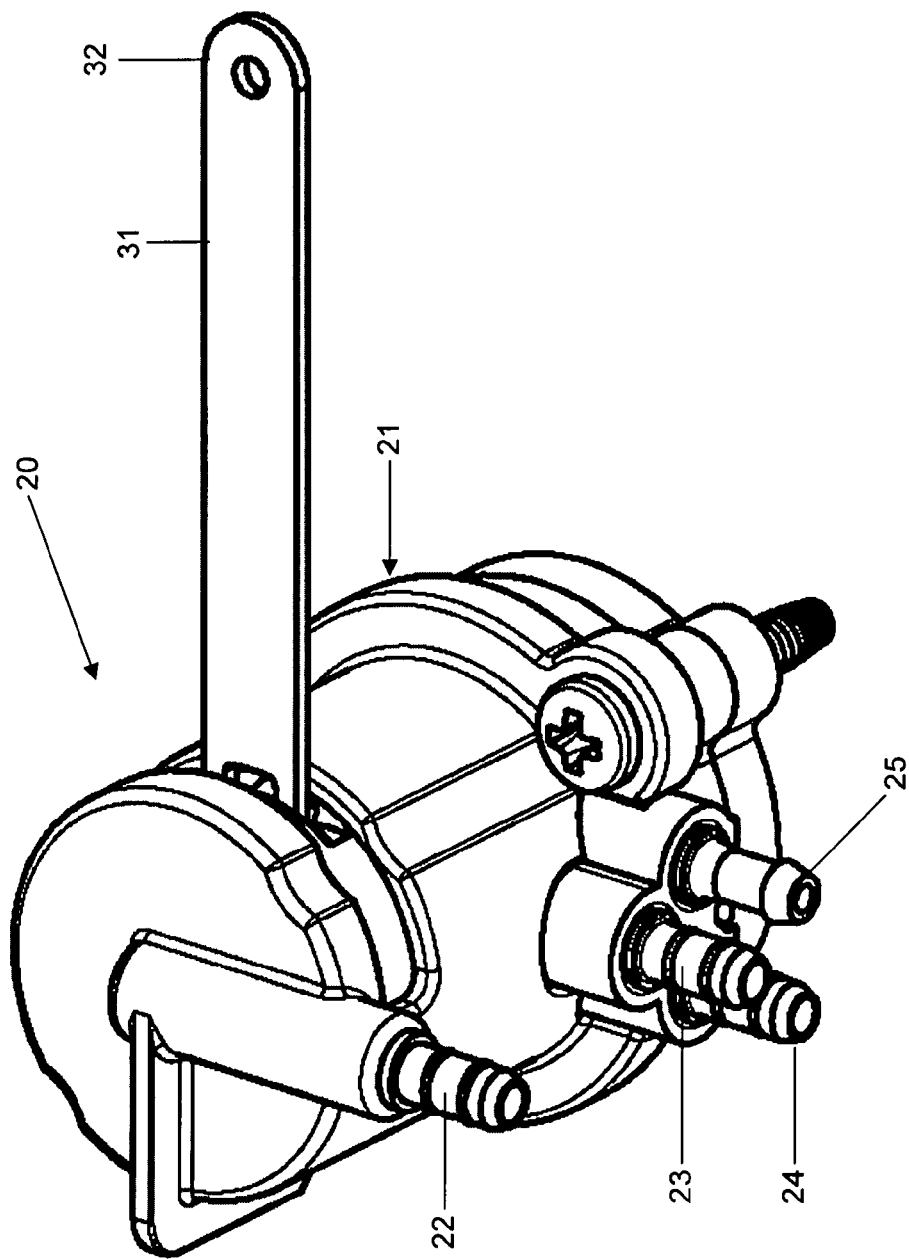
FIG. 2 shows a perspective view of the leveling valve of an embodiment of the present invention.

Turning now to FIGS. 2 and 3, the leveling valve 20 of the present embodiment is depicted. As shown in FIGS. 2 and 3A, the leveling valve 20 is provided with a housing 21. In the present embodiment, the housing 21 is a three-piece housing that includes first, second, and third housing portions 21a-21c; however, in alternative embodiments, the housing 21 may be provided with more than or less than three housing portions.

As shown in FIG. 3A, the leveling valve 20 of the present embodiment includes a clutch 30 provided with the clutch arm 31, a first clutch member 35, and a second clutch member 45. Turning now to FIG. 4, the clutch arm 31 of the present embodiment is depicted. The clutch arm 31 is moved by the seat 100 in response to a change in the height of the seat. As shown in FIG. 3A, the clutch arm 31 is provided with a first end 32. As shown in FIG. 1, the first end 32 is configured to connect to the seat 100. Accordingly, as the height of the seat varies, the clutch arm 31 rotates about its second end 33.

As shown in FIG. 4, the clutch arm 31 is provided with a second end 33. According to one aspect of the present embodiment, the second end 33 is configured to apply torque to the first clutch member 35. According to another aspect of the present embodiment, the second end 33 is configured to apply torque to the first clutch member 35 in response to a change in the height of the seat 100. As shown in FIG. 3A, the second end 33 extends through an opening 21d of the housing 21 of the leveling valve 20 and is secured to the first clutch member 35. The clutch arm 31 is configured to extend through an opening 35a (shown in FIG. 6) in the first clutch member 35 and, in the present embodiment, snap fit to the first clutch member 35 through use of at least one finger 34 on the clutch arm 31. Also shown, the second end 33 of the clutch arm 31 is preferably provided with two legs 33a, 33b that extend generally parallel to each other and are spaced by a cutout area 33c. In the present embodiment, the two legs 33a, 33b contact protruding stops 36, 37 (shown in FIG. 5) that are provided on the first clutch member 35 to prevent relative rotation between the second end 33 of the clutch arm 31 and the first clutch member 35. Although in the present embodiment, the clutch arm 31 is snap fit to the first clutch member 35, in alternative embodiments, the clutch arm 31 may be integrally connected to the first clutch member 35 or may be secured via other arrangements, such as via an adhesive, welding, and/or fasteners.

Turning now to FIGS. 5 and 6, the first clutch member 35 of the present embodiment is depicted. As shown in FIG. 6, the first clutch member 35 is provided with at least one first torque applying surface 38. According to one aspect of the present embodiment, the first torque applying surface 38 is configured to apply torque to a first torque receiving surface 48 on the second clutch member 45. According to another aspect of the present embodiment, the first torque applying surface 38 is configured to apply torque to the first torque receiving surface 48 on the second clutch member 45 when the clutch 30 is engaged. As shown, in the present embodiment, the first torque applying surfaces 38 are provided as tabs 39. In the present embodiment, when the clutch 30 is engaged, the tabs 39 engage notches 49 provided on the first torque receiving surface 48 of the second clutch member 45 to rotate the second clutch member 45 in either a first or a second direction in response to change of the height of the seat 100.

Figure 3B:
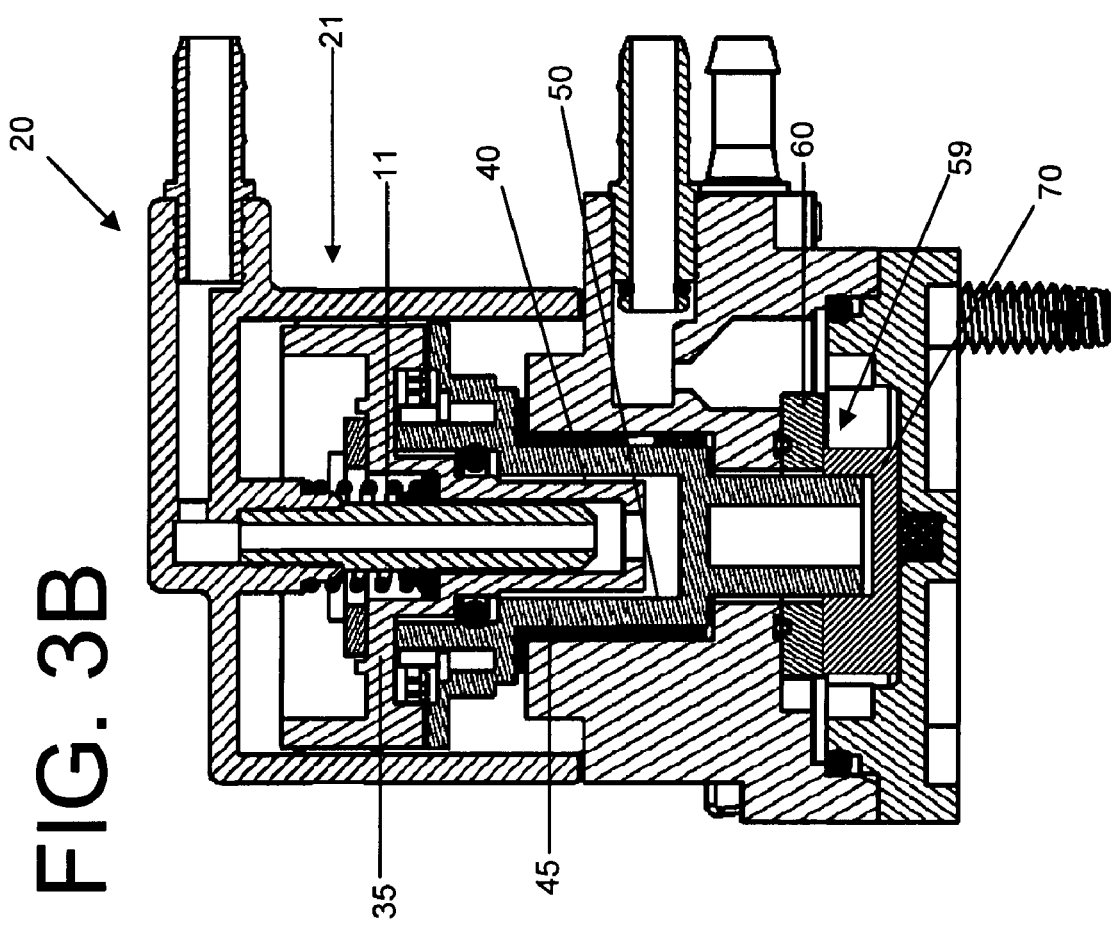
FIG. 3B shows a sectional view of the leveling valve of an embodiment of the present invention.

As shown in FIG. 6, the first clutch member 35 of the present embodiment is provided with an aligning surface 40. As shown in FIGS. 3A and 3B, in the present embodiment, the aligning surface 40 of the first clutch member 35 telescopes within an aligning surface 50 that is provided on the second clutch member 45 as the clutch transitions between and engaged position and a disengaged position. In the present embodiment, the aligning surface 40 is provided with a generally cylindrical shape that is complementary to a generally cylindrical shape of the aligning surface 50 on the second clutch member 45.

Turning now to FIG. 7A, the second clutch member 45 of the present embodiment is depicted. As shown therein, the second clutch member 45 is provided with at least one first torque receiving surface 48. According to one aspect of the present embodiment, the first torque receiving surface 48 is configured to receive torque from the first torque applying surface 38 of the first clutch member 35. According to another aspect of the present embodiment, the first torque receiving surface 48 is configured to receive torque from the first torque applying surface 38 of the first clutch member 35 when the clutch 30 is engaged. As shown, in the present embodiment, the second clutch member 45 is provided with a plurality of first torque receiving surfaces 48. The first torque receiving surfaces 48 are provided with a plurality of notches 49 that extend semi-circumferentially around the axis 45a of the second clutch member 45. In the present embodiment, when the clutch 30 is engaged, the tabs 39 engage the notches 49 to rotate the second clutch member 45 in either a first or a second direction in response to change of the height of the seat 100.

Although in the present embodiment the first torque receiving surface 48 is provided with a plurality of notches 49 and the first torque applying surface 38 is provided with at least one tab 39, the scope of the present invention is not so limited. The first torque receiving surface 48 may be provided with any shape that is capable of receiving torque from the first clutch member 35 and the first torque applying surface 38 may be provided with any shape that is capable of applying torque to the second clutch member 45. By way of example, and not limitation, in alternative embodiments, the first torque receiving surface 48 and the first torque applying surface 38 may be provided with mating spines. By way of further example, and not limitation, in alternative embodiments, the first torque receiving surface 48 may be provided with one or more tabs 39 and the first torque applying surface 38 may be provided with one or more notches 49.

As shown in FIG. 7A, the second clutch member is provided with a torque applying surface 55. According to one aspect of the present embodiment, the torque applying surface 55 is configured to apply torque to a torque receiving surface 74 on a valve 70. According to another aspect of the present embodiment, the torque applying surface 55 is configured to apply torque to the torque receiving surface 74 on the valve 70 when torque is applied to the second clutch member 45 by the first clutch member 35. As shown, the torque applying surface of the present embodiment is provided with a semi circular shape. In the present embodiment, when torque is applied to the second clutch member 45 by the first clutch member, the torque applying surface 55 engages a torque receiving surface 74 on the valve 70 to rotate the valve in either a first or a second direction in response to a change in the height of the seat 100.

Turning now to FIGS. 3A and 3B, the leveling valve 20 of the present embodiment includes a valve assembly 59 that is received within a valve receiving chamber 91 of the housing 21. As shown therein, the valve assembly 59 includes a valve plate 60 and a valve 70.

Turning now to FIG. 8A, the valve plate 60 of the present embodiment is depicted. As shown therein, the valve plate 60 is generally disk shaped. As shown in FIG. 8A, located on the periphery of the valve plate 60 is at least one flat, such as flats 61a, 61b, which are configured to prevent rotation of the valve plate 60 within the housing 21 of the leveling valve 20. As shown, at least one of the flats 61a, 61b or another portion of the periphery of the valve plate 60 may be provided with an orienting structure 61c that is adapted to fit within a groove of the housing 21 so that the second opening 63 is properly oriented within the housing 21.

Also shown in FIG. 8A, the valve plate 60 is provided with a first opening 62 and a second opening 63. The first and second openings 62, 63 extend from a first face 64 (shown in FIG. 8B) to a second face 65 (shown in FIG. 8B) of the valve plate 60. In the presently depicted embodiment, the first opening 62 is centrally located on the valve plate and the second opening 63 is located radially outward from the first opening 62. According to one aspect of the present embodiment, as hereinafter discussed, the first opening 62 is configured to allow pressurized gas to flow from a second port 24 to the third port 25 in order to decrease the amount of pressurized air in the air bladder 110 when the valve 70 is in a third position. According to another aspect of the present embodiment, as hereinafter discussed, the second opening 63 is configured to allow pressurized gas to flow from the first port 23 to the second port 24 in order to increase the amount of pressurized air in the air bladder 110 when the valve 70 is in a second position.

Although in the present embodiment the leveling valve 20 is provided with a valve assembly 59 that includes the valve plate 60, in alternative embodiments the valve plate 60 may be integral to the housing 21, whereby the housing 21 defines the first and second openings 62, 63.

Turning now to FIGS. 9A and 9B, the valve 70 of the present embodiment is depicted. As shown therein the valve 70 defines a chamber 73. As shown in FIG. 9B, the chamber 73 is open at one end 71 and closed at another end 72. In the present embodiment, the torque receiving surface 74 of the valve 70 is located within the chamber 73. According to one aspect of the present embodiment, the torque receiving surface 74 is configured to receive torque from the torque applying surface 55 on the second clutch member 45. According to another aspect of the present embodiment, the torque receiving surface 74 is configured to receive torque from the torque applying surface 55 on the second clutch member 45 when torque is applied to the second clutch member 45 by the first clutch member 35. In the present embodiment, the torque receiving surface 74 includes two walls 75, 76 that extend partially towards each other from a circumferential wall 77 that defines the chamber 73.

Although in the present embodiment the torque receiving surface 74 on the valve 70 is provided with a plurality of walls 75, 76 and the torque applying surface 55 on the second clutch member 45 is provided with two walls located at ends of a semicircular shape, the scope of the present invention is not so limited. The torque receiving surface 74 may be provided with any shape that is capable of receiving torque from the second clutch member 45 and the torque applying surface 55 may be provided with any shape that is capable of applying torque to the valve 70. By way of example, and not limitation, in alternative embodiments, the torque receiving surface 74 and the torque applying surface 55 may be provided with mating spines. By way of further example, and not limitation, in alternative embodiments, the torque receiving surface 74 may be provided on a semicircular shape and the torque applying surface 55 may be provided walls, such as 75, 76.

Figure 10:
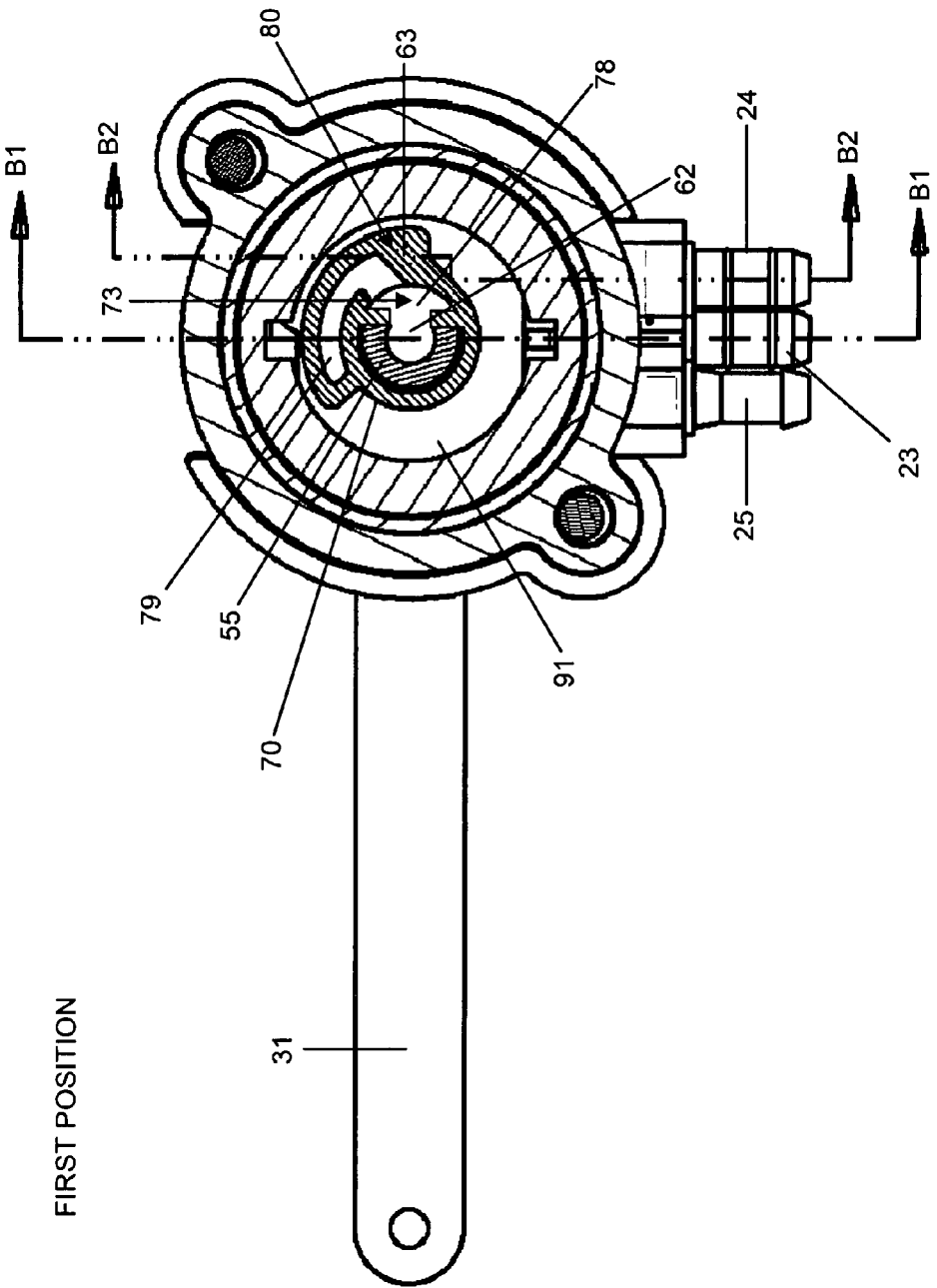
FIG. 10 shows a sectional view of an embodiment of the leveling valve.
Figure 13:
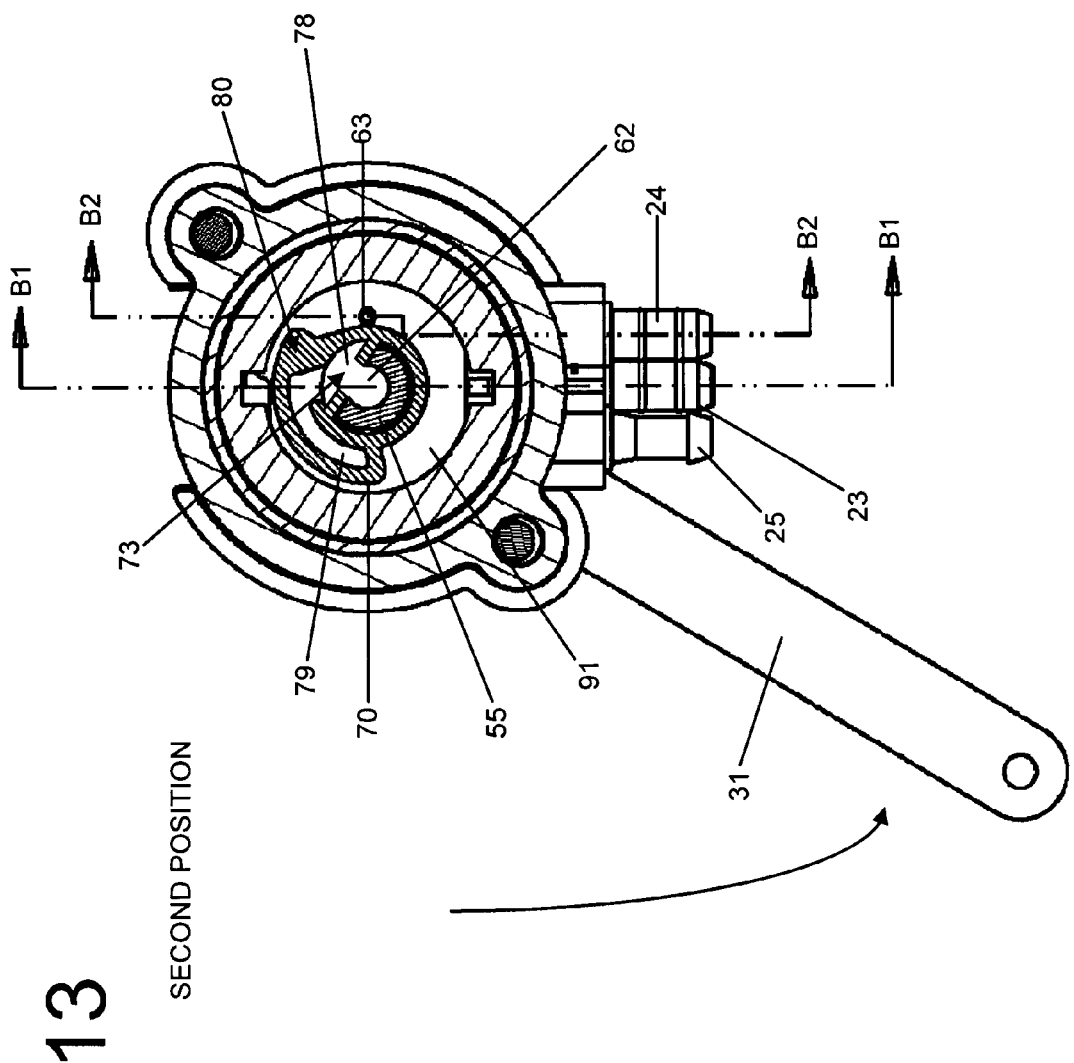
FIG. 13 shows a sectional view of an embodiment of the leveling valve.
Figure 16:
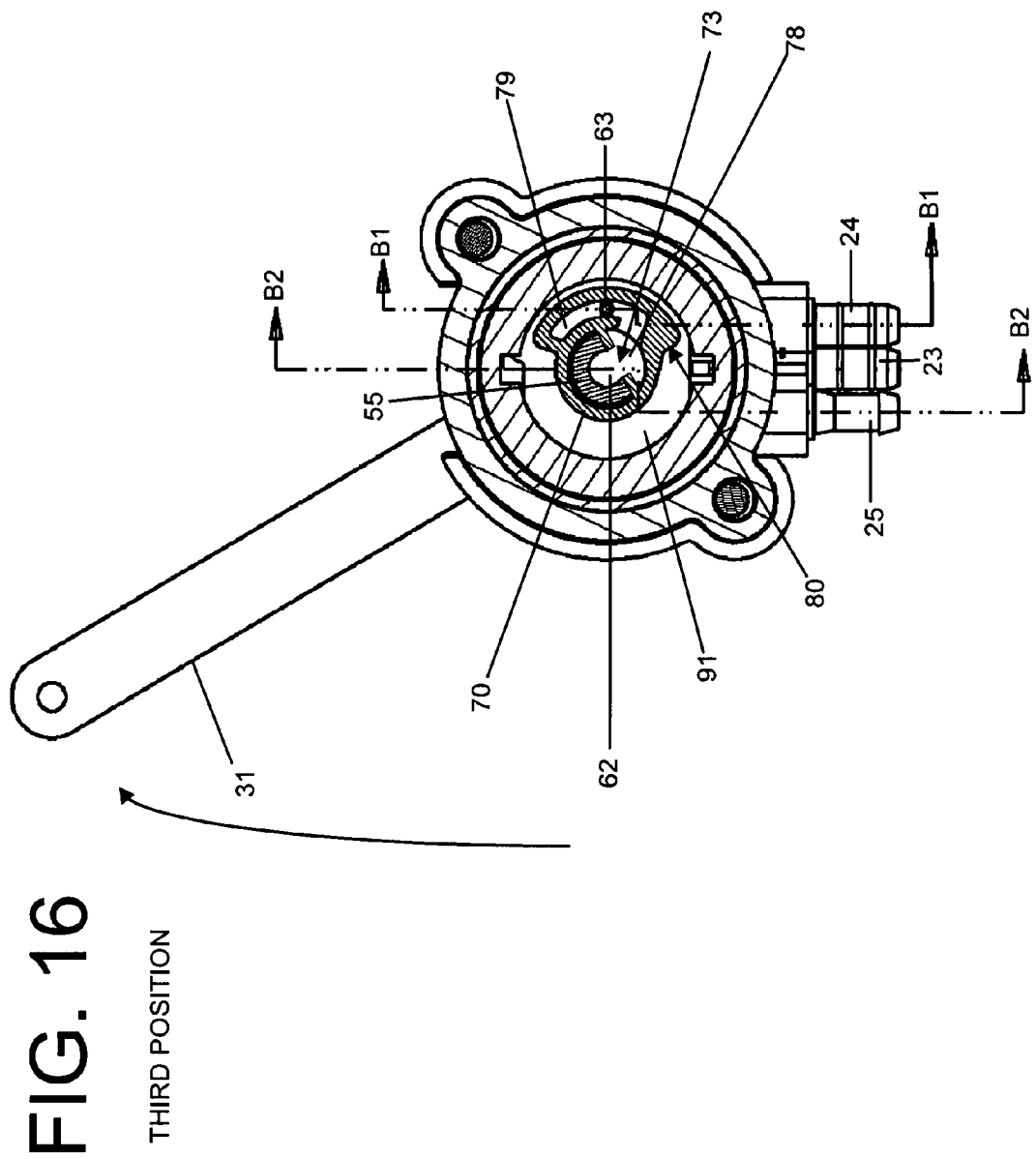
FIG. 16 shows a sectional view of an embodiment of the leveling valve.

As shown in FIG. 9A, the chamber 73 is provided with a first chamber portion 78 and a second chamber portion 79 that is located radially outward from the first chamber portion 78. In the present embodiment, the torque receiving surface 74 is located within the first chamber portion 78. As shown, the second chamber portion 79 connects with the first chamber portion 78. As shown in FIG. 10, in the present embodiment, at least a portion of the first chamber portion 78 extends over the first opening 62 of the valve plate 60. As shown in FIGS. 10, 13, and 16, the second chamber portion 79 may selectively extend over the second opening 63 of the valve plate 60 so that the second opening 63 can be selectively connected with the first opening 62 via the first and second chamber portions 78, 79 of the chamber 73.

As shown in FIG. 9A, the valve 70 is also provided with an isolating portion 80. In the present embodiment, the isolating portion 80 is located radially outward from the first chamber portion 78 of the valve 70. As shown in FIGS. 10 and 12, the isolating portion 80 may selectively extend over the second opening 63 of the valve plate 60 so that the second opening 63 can be selectively isolated from the first opening 62. Also shown in FIGS. 10, 13, and 16, the isolating portion 80 may selectively extend over the second opening 63 of the valve plate 60 so that the second opening 63 can be selectively isolated from the valve receiving chamber 91 of the housing 21.

Figure 15:
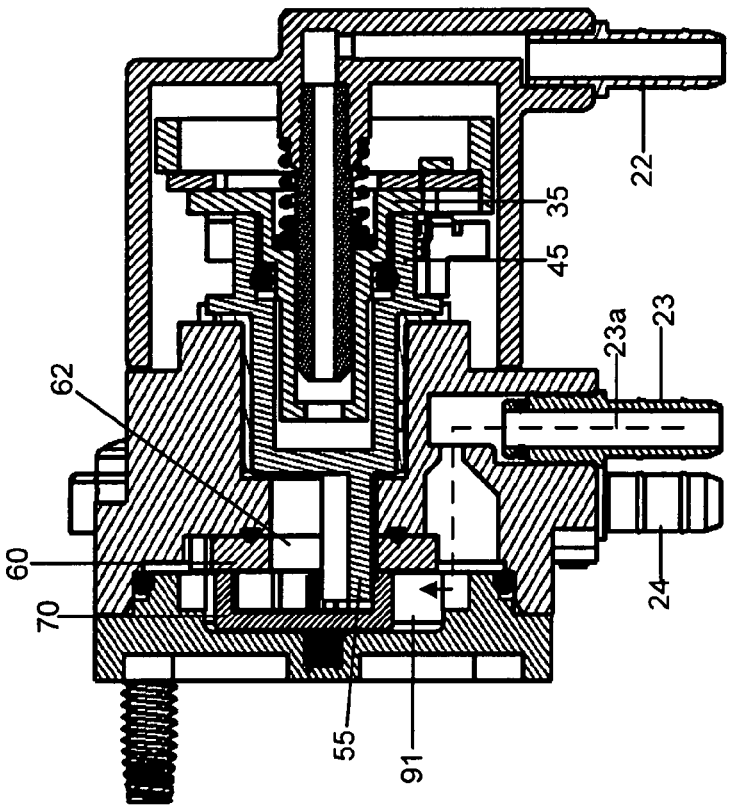
FIG. 15 shows a sectional view taken along line B2 of FIG. 13 of an embodiment of the leveling valve.

As shown in FIGS. 13 and 15, the valve 70 may be selectively positioned so that the second opening 63 is uncovered by the valve 70. According to one aspect of the present embodiment, when the second opening 63 is uncovered by the valve 70, the second opening 63 is connected with the valve receiving chamber 91. According to another aspect of the present embodiment, when the second opening 63 is uncovered by the valve 70, the second opening 63 is connected to a first pathway 23a that extends from a first port 23. According to yet another aspect of the present embodiment, when the second opening 63 is uncovered by the valve 70, the second opening 63 is selectively isolated from the first opening 62.

Turning now to FIG. 2, the leveling valve 20 is provided with a first port 23. In the present embodiment, the first port 23 is configured to connect to a source of pressurized air, such as a conduit 1 (shown in FIG. 1), and deliver pressurized air to the leveling valve 20 from a pressurized air source 115 (shown in FIG. 1). As shown in FIG. 11, the first port 23 connects with a first pathway 23a. In the present embodiment, the first pathway 23a extends from the first port 23 to the valve receiving chamber 91 of the leveling valve 20. Accordingly, in the present embodiment, pressurized air may travel from the first port 23 to the valve receiving chamber 91.

Turning now to FIG. 2, the leveling valve 20 is provided with a second port 24. In the present embodiment, the second port 24 is configured to connect to the exit valve 150 via a conduit 2 so that pressurized air may be selectively added or removed from the air bladder 110, as hereinafter discussed. In alternative embodiments, however, the conduit 2 may connect directly to the air bladder 110, such as, for example, in embodiments of the seat height control system 10 that do not include the exit valve 150. As shown in FIG. 12, the second port 24 connects with a second pathway 24a. The second pathway 24a extends from the second port 24 to the second opening 63 in the valve plate 60.

Figure 18:
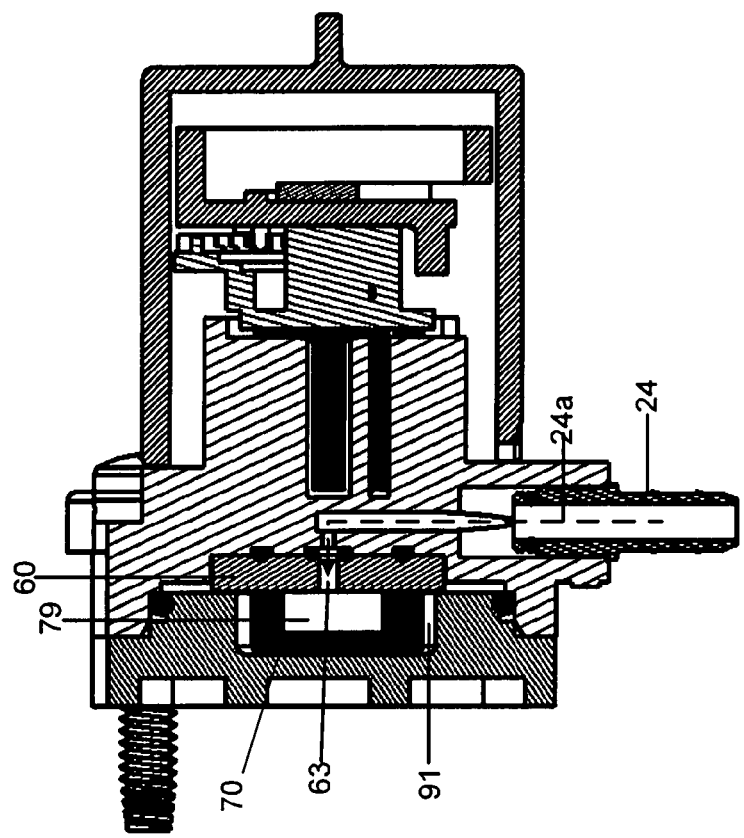
FIG. 18 shows a sectional view taken along line B2 of FIG. 16 of an embodiment of the leveling valve.

Turning now to FIG. 2, the leveling valve 20 is provided with a third port 25. In the present embodiment, the third port 25 is configured to vent pressurized air delivered to the leveling valve 20 from the air bladder 110. As shown in FIG. 18, the third port 25 connects with a third pathway 25a. The third pathway 25a extends from the third port 25 to the first opening 62 in the valve plate 60. Accordingly, as hereinafter discussed, by actuation of the valve 70, pressurized air from the air bladder 110 may selectively travel from the second port 24 to the third port 25 via the second pathway 24a, second opening 63, second chamber portion 79, first chamber portion 78, first opening 62, and the third pathway 25a.

Accordingly, as hereinafter discussed, by actuation of the valve 70, pressurized air may be selectively delivered to the air bladder 110 by directing the pressurized air from the first port 23 to the second port 24 via the first pathway 23a, valve receiving chamber 91, second opening 63, and second pathway 24a, and onto the exit valve 150 via the second port 24. Additionally, as hereinafter discussed, by actuation of the valve 70, pressurized air from the air bladder 110 may selectively travel to the second port 24, and, then from the second port 24 to the third port 25 via the first pathway 24a, second opening 63, second chamber portion 79, first chamber portion 78, first opening 62, and the third pathway 25a. Moreover, as hereinafter discussed, by actuation of the valve 70, the isolation portion 80 of the valve 70 may selectively cover the second opening 63 and block the first pathway 23a from connecting with the second pathway 24a and block the second pathway 24a from connecting with the third pathway 25a. Advantageously, when the isolating portion 80 of the valve covers the second opening 63, the leveling valve 20 does not adjust the amount of pressurized air in the air bladder 110.

According to one aspect of the present embodiment, the leveling valve 20 is configured to maintain the height of the seat 100 when the clutch 30 is engaged. FIG. 3B shows the clutch 30 in an engaged position. As shown in FIG. 3B, in the present embodiment, a biasing member 11 is located between the first clutch member 35 and the housing 21. Advantageously, when the clutch 30 is in an engaged position, the first torque applying surface 38 of the first clutch member 35 is positioned to apply torque to the torque receiving surface 38 of the second clutch member 35 in response to changes in the height of the seat 100. In alternative embodiments, pneumatic pressure or gravity may be used to bias the clutch 30 in the engaged position.

Turning now to FIGS. 10-18, the valve 70 of the present embodiment is rotatable between three positions. FIGS. 10-12 show the first position of the present embodiment. When the valve 70 is in the first position, the isolating portion 80 of the valve 70 covers the second opening 63 and blocks the first pathway 23a from connecting with the second pathway 24a and the third pathway 25a from connecting with the second pathway 24a. Accordingly, when the valve 70 is in the first position, the amount of pressurized air in the air bladder 110 is not adjusted by the leveling valve 20.

Figure 14:
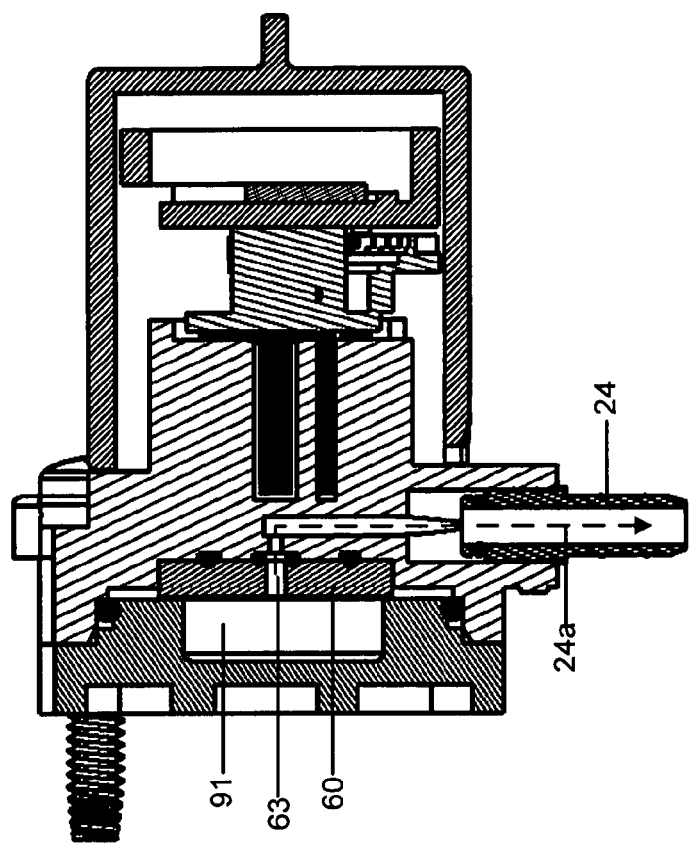
FIG. 14 shows a sectional view taken along line B1 of FIG. 13 of an embodiment of the leveling valve.

FIGS. 13-15 show the valve 70 of the present embodiment in a second position. When the valve 70 is in the second position, the valve 70 is actuated so that the first pathway 23a is connected to the second pathway 24a. In the second position, the valve 70 does not extend over the second opening 63. Accordingly, pressurized air delivered to the first port 23 travels to the second port 24 via the first pathway 23a, valve receiving chamber 91, second opening 63, and second pathway 24a. The pressurized air may be delivered from the second port 24 to the bladder 110 by the conduit 2 or may be delivered to the air bladder 110 via the conduit 2 and the exit valve 150, as shown in the arrangement of FIG. 1.

Figure 17:
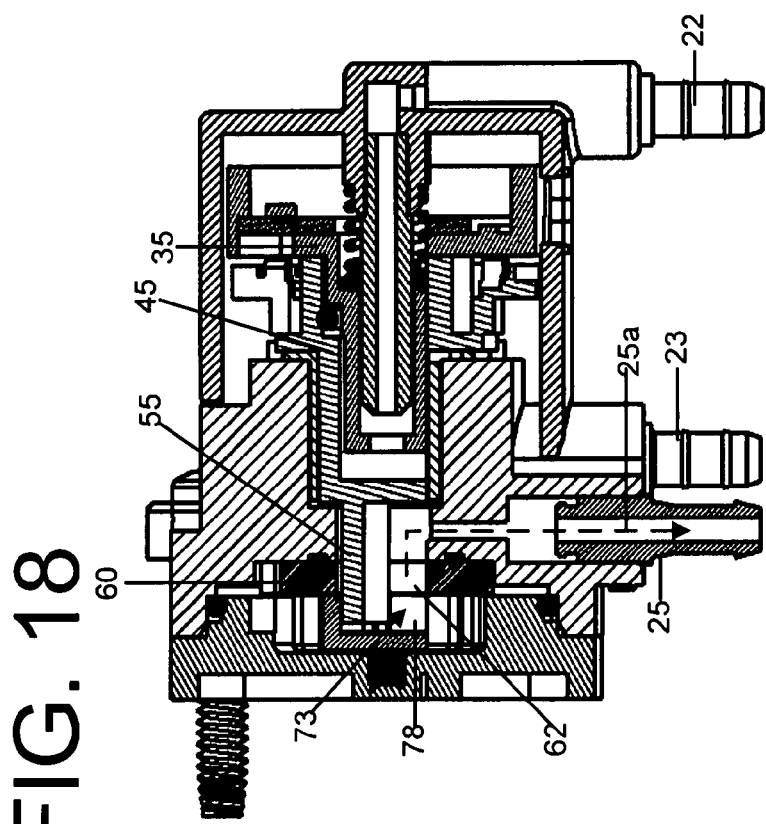
FIG. 17 shows a sectional view taken along line B1 of FIG. 16 of an embodiment of the leveling valve.

FIGS. 16-18 show the valve 70 of the present embodiment in a third position. In the third position, the valve 70 is actuated so that the second pathway 24*a* is connected to the third pathway 25*a*. In the third position, the second chamber portion 79 extends over the second opening 63 and the first and second chamber portions 78, 79 connect the first and second openings 62, 63. Accordingly, in the present embodiment, pressurized air from the air bladder 110 travels to the third port 25, via the conduit 2, second port 24, second pathway 24*a*, second opening 63, second chamber portion 79, first chamber portion 78, first opening 62, and the third pathway 25*a*. Advantageously, the third port 25 is vented so that the pressure in the air bladder 110 is relieved.

According to one aspect of the present embodiment, the valve 70 rotates between the first, second, or third positions when the clutch 30 is engaged. According to another aspect of the present embodiment, the valve 70 rotates between the first, second, or third positions when a change in the height of the seat 100 occurs. As shown by a comparison of FIG. 10 with FIGS. 13 and 16, when the clutch 30 is engaged a change in the height of the seat 100 causes the clutch arm 31 to rotate. When this occurs, torque is applied to the first clutch member 35, thereby rotating the first clutch member 35. Rotation of the first clutch member 35, in turn, results in the first torque applying surface 38 of the first clutch member 35 applying torque to the first torque receiving surface 48 of the second clutch member 45. Rotation of the second clutch member 45, in turn, results in the torque applying surface 55 of the second clutch member 45 applying torque to the torque receiving surface 74 of the valve 70. Depending on the direction of rotation, the valve 70 may rotate from the first position to either the second position, whereat pressurized air is added to the air bladder 110, thereby increasing the height of the seat 100, or a third position, whereat pressurized air is relieved from the air bladder 110, thereby decreasing the height of the seat 100. Accordingly, the first position is the normal position of the valve 70, whereat air is neither added nor relieved from the air bladder 110.

FIGS. 13-15 depict the valve 70 in a second position. In the second position, the valve 70 is actuated so that pressurized air passes from the first port 23 to the second port 24 where it may be introduced into the air bladder 110 in order to increase the height of the seat 100. The valve 70 rotates to the second position in response to the height of the seat 100 decreasing while the clutch 30 is engaged. Relative to the first position, the valve 70 rotates in a first direction, which in the present embodiment is counter-clockwise, to the second position. As shown in FIGS. 13 and 15, when the leveling valve 20 is in a second position, the valve 70 is rotated so that so that the second opening 63 of the valve plate 60 is uncovered by the valve 70. Accordingly, the first port 23 delivers pressurized air to the valve receiving chamber 91 via the first pathway 23*a*. The pressurized air then passes into the second pathway 24*a* via the second opening 63 in the valve plate 60. The pressurized air is then delivered to the air bladder 110 via the second port 24. As the amount of pressurized air in the bladder increases, the height of the seat 100 increases. This eventually causes the clutch arm 31, first clutch member 35, and second clutch member 45, and valve 70 to rotate in a second direction, opposite the first direction, which in the present embodiment is clockwise. As the second clutch member 45 rotates, eventually, the valve 70 is rotated back to the first position, whereat the isolating portion 80 of the valve 70 extends over the second opening 63 and blocks the first pathway 23*a* from connecting with the second pathway 24*a* to thereby prevent further introduction of pressurized air into the air bladder via the leveling valve 20. This occurs when the height of the seat 100 is returned to the height at which the seat 100 was at when the clutch 30 was last engaged.

FIGS. 16-18 depict the valve 70 in a third position. In the third position, the valve 70 is actuated so that pressurized air passes from the second port 24 to the third port 25 where it may be vented in order to decrease the height of the seat 100. The valve 70 rotates to the third position in response to the height of the seat 100 increasing while the clutch 30 is engaged. Relative to the first position, the valve 70 rotates in a second direction, which in the present embodiment is clockwise, to the third position. As shown in FIGS. 16 and 17, when the leveling valve 20 is in a third position the valve 70 is rotated so that the second chamber portion 79 extends over the second opening 63. Accordingly, pressurized air in the air bladder 110 travels from the second port 24 via the second pathway 24*a* to the second opening 63. From the second opening 63, the pressurized air enters the chamber 73. In the present embodiment, the air travels from the second opening 63 to the second chamber portion 79 and onto the first chamber portion 78. From the chamber 73 it enters the third pathway 25*a*, via the first opening 62 in the valve plate 60, and onto the third port 25, whereat the pressurized air may be vented. As the amount of pressurized air in the bladder decreases, the height of the seat 100 decreases. This eventually causes the clutch arm 31, first clutch member 35, and second clutch member 45, and valve 70 to rotate in the first direction, which in the present embodiment is counter-clockwise. As the second clutch member 45 rotates in the first direction, eventually, the valve 70 is rotated back to the first position, whereat the isolating portion 80 of the valve 70 extends over the second opening 63 and blocks the second pathway 24*a* from connecting with the third pathway 25*a* to thereby prevent further release of the pressurized air in the air bladder via the leveling valve 20. This occurs when the height of the seat 100 is returned to the height at which the seat 100 was at when the clutch 30 was last engaged.

As previously discussed, when the clutch 30 is engaged, a generally constant height of the seat 100 is generally maintained; however, there are times when it is desirable to change the seat height. For example, in the present embodiment of the height control system 10, an exit valve 150 is provided which rapidly deflates the air bladder 110, such as, for example, when an occupier of the seat 100 wishes to rapidly lower the seat 100 prior to unoccupying the seat 100. By way of yet another example, different occupiers of the seat 100 may have different seat height preferences. Accordingly, in the present embodiment, a height adjusting valve 120 is provided which allows an occupier to increase the height of the seat 100 by increasing the amount of pressurized air in the air bladder or decrease the height of the seat 100 by decreasing the amount of pressurized air in the air bladder.

FIGS. 20-27 show the height adjusting valve 120 of the present embodiment. The preferred height adjusting valve 120 is a three-way valve, such as the rocker valve shown. Numerous three-way valves suitable for use as a height adjustment valve are known in the art and the seat height control system 10 of the present invention contemplates using other three-way valves for the height adjustment valve other than the particular height adjusting valve 120 shown in FIGS. 20-27. The height adjusting valve 120 of the present embodiment is merely the preferred three-way height adjustment valve of the seat height control system 10; and the foregoing details of the height adjusting valve 120 are intended to demonstrate one possible arrangement for adjusting the height of the seat and disengaging the clutch 30 of the leveling valve 20 via use of a three-way height adjusting valve. Accordingly, it is within the scope of the present invention to utilize other three-way valves as a height adjusting valve 120.

As shown in FIGS. 20-27, the height adjusting valve 120 of the present embodiment is provided with a rocker 125, a first port 126, a second port 127, and a third port 128. The second port 127 selectively delivers pressurized air to the leveling valve 20 to disengage the clutch 30. The second port 127 selectively relieves pressurized air from the leveling valve 20 to engage the clutch 30. The third port 128 selectively delivers pressurized air to the air bladder 110 to increase the height of the seat. The third port 128 selectively relieves pressurized air from the air bladder 110 to decrease the height of the seat 100. The first port 126 selectively supplies pressurized air to the second or third ports 127, 128. Accordingly, as shown in FIG. 1, the first port 126 receives pressurized air from the pressurized air source 115, such as via conduit 3, the second port 127 connects to a fourth port 22 of the leveling valve 20, such as via conduit 4, and the third port 128 connects to the air bladder 110, such as via conduit 5.

As shown in FIGS. 21, 22, 24, and 26, the rocker 125 is rotatable about an axis 129 and provided with an interfacing portion 130 and a cam portion 131 that connects to an adjusting valve 132. As shown, the interfacing portion 130 and the cam portion 131 are located on opposite sides of the axis 129. As shown in FIGS. 20 and 21, the interfacing portion 130 is configured to be depressed by a user, whereby the rocker 125 rotates about the axis 129 in either a first direction 129a, which in the present embodiment is clockwise, or a second direction 129b, which in the present embodiment is counterclockwise.

Turning now to FIGS. 22-27, the adjusting valve 132 is provided with three positions. FIGS. 22-23 show the adjusting valve 132 in a first position. The first position is the normal position of the adjusting valve 132 when the interfacing portion 130 of the rocker 125 is not being depressed by a user. As shown in FIG. 23, the adjusting valve 132 is provided with a first chamber 132a, a second chamber 132b, a third chamber 132c, and a fourth chamber 132d. As shown in FIG. 23, when the adjusting valve 132 is in the first position, the second port 127 is connected to the third chamber 132c, which in turn is vented to the outside via a cavity (not shown) under the rocker 125. Also shown in FIG. 23, when the adjusting valve 132 is in the first position, the adjusting valve 132 blocks the first and third ports 126, 128 from connecting to each other. Accordingly, when the adjusting valve 132 is in the first position, pressurized air received by the first port 126 is blocked by the adjusting valve 132 from being delivered to the air bladder 110 via the third port 128. Additionally, pressurized air received by the first port 126 is blocked by the adjusting valve 132 from being delivered to the leveling valve 20 via the second port 127 and thereby disengaging the clutch 30 of the leveling valve 20. Furthermore, pressurized air previously used to disengage the clutch 30 and delivered to the fourth port 22 of the leveling valve 20 by the second port 127 of the height adjustment valve 120 is vented via the second port 127 and the third chamber 132c, thus ensuring that the clutch 30 of the leveling valve 20 is an engaged position. Accordingly, when the height adjusting valve 120 is in the first position, the leveling valve 20 operates to maintain a generally constant seat height, as previously discussed.

FIGS. 24-25 show the adjusting valve 132 in a second position. The valve transitions from the first position to the second position when a user depresses the interfacing portion 130 so that the rocker 125 rotates about the axis 129 in a first direction 129a, as shown in FIG. 23. When this occurs, the cam portion 131 on the rocker 125 slides the adjusting valve 132 so that the fourth chamber 132d connects the first port 126 with the second port 127 and the third port 128. Accordingly, pressurized air passes from the first port 126 to the air bladder 110 via the fourth chamber 132d, third port 128, and conduit 5 to thereby increase the height of the seat 100. Additionally, pressurized air passes from the first port 126 to the second port 127 via the fourth chamber 132d. The pressurized air is then delivered to the fourth port 22 of the leveling valve 20 via the conduit 4 to disengage the clutch 30 of the leveling valve 20, as hereinafter discussed.

FIGS. 26-27 show the adjusting valve 132 in a third position. The adjusting valve 132 transitions from the first position to the third position when a user depresses the interfacing portion 130 so that the rocker 125 rotates about the axis 129 in a second direction 129b, as shown in FIG. 26. When this occurs, the cam portion 131 on the rocker 125 slides the adjusting valve 132 so that the second chamber 132b connects the first port 126 with the second port 127. Additionally, as this occurs, the cam portion 131 on the rocker 125 slides the adjusting valve 132 so that the first chamber 132a, which is vented to the outside via a cavity (not shown) under the rocker 125, connects with the third port 128. Accordingly, pressurized air passes from the first port 126 to the second port 127 via the second chamber 132b. The pressurized air is then delivered to the fourth port 22 of the leveling valve 20 via the conduit 4 and disengages the clutch 30 of the leveling valve 20, as hereinafter discussed. Furthermore, pressurized air in the air bladder 110 is vented via the third port 128 and the first chamber 132a, which thereby decreases the height of the seat 100.

Advantageously, when the height adjusting valve 120 is in the second or third positions, pressurized air is delivered to a fourth port 22 by the height adjusting valve 120. When this occurs, the first clutch member 35 is uncoupled from the second clutch member 45 and rotation of the clutch arm 131 and the first clutch member 35 in response to a change in seat height results in the first clutch member 35 rotating, at least to some degree, relative to the second clutch member 45. Once the desired seat height is attained and the interfacing portion 130 of the height adjusting valve 120 is no longer depressed, the adjusting valve 132 returns to the first position, whereat the pressurized air delivered to the fourth port 22 is vented by the height adjustment valve 120, as previously discussed. Thereafter, the clutch 30 engages and the leveling valve 20 will generally maintain this new seat height, as previously discussed, until the clutch 30 is once again disengaged or the exit valve 150 is activated, as subsequently discussed.

Figure 19:
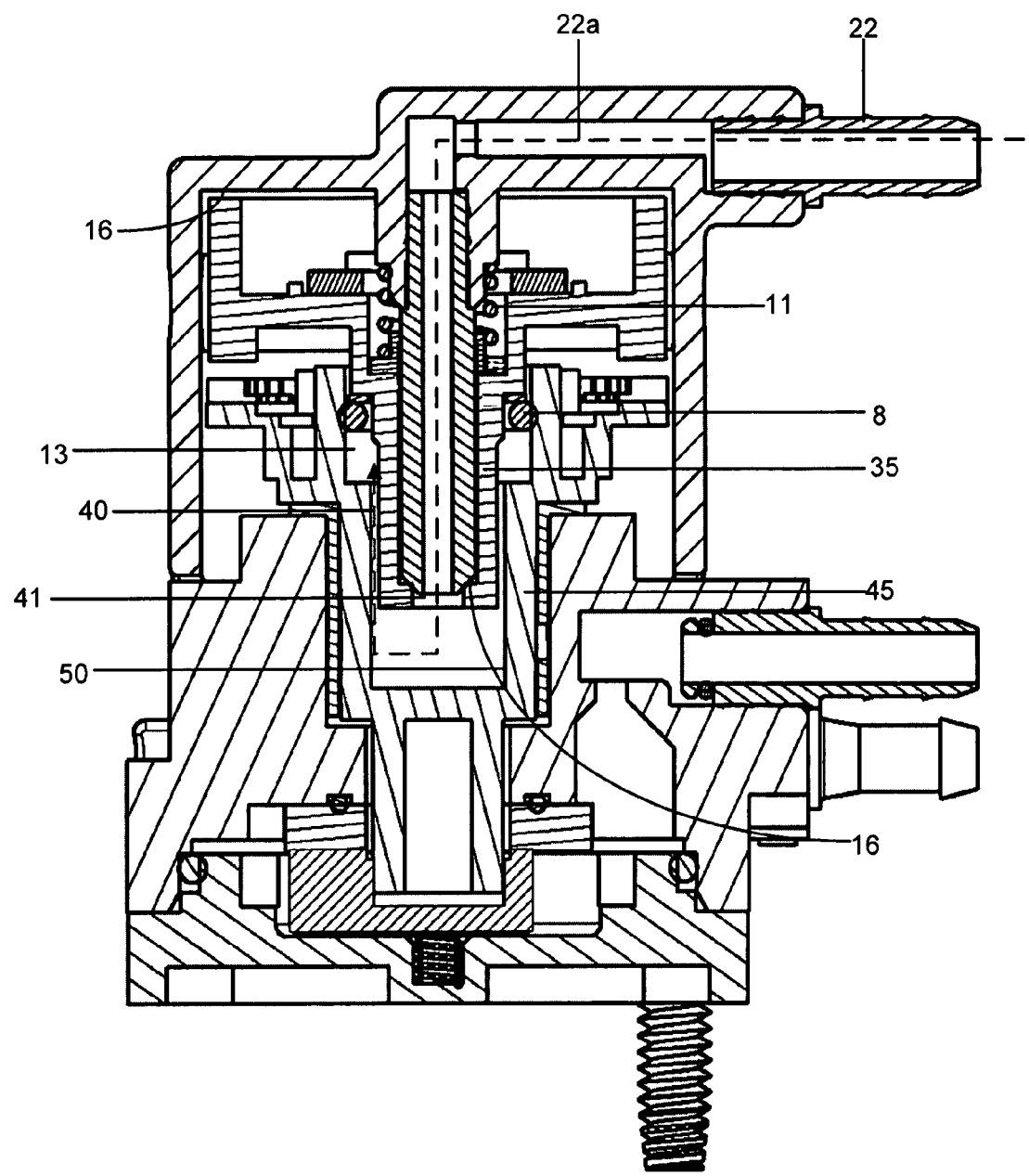
FIG. 19 shows a sectional view of an embodiment of the leveling valve.

FIG. 19 shows the clutch 30 in a disengaged position, which allows the height of the seat 100 to be adjusted. As shown, the leveling valve 20 defines a fourth pathway 22a that extends from the fourth port 22 to a chamber 13 located between the first clutch member 35 and the second clutch member 45. In the present embodiment, when the clutch 30 is disengaged, pressurized air is introduced to the fourth port 22, such as via conduit 4. Advantageously, the fourth pathway 22a delivers pressurized air to a chamber 13. As shown the pathway 22a may pass through an opening 41 defined by the first clutch member 35. Also shown, the pathway 22a may extend between the aligning 40, 50 of the first and second clutch members 35, 45. As pressurized air is introduced, a seal 8, which in the presently preferred embodiment extends resiliently around the first clutch member 35, seals a joint between the first and second clutch members 35, 45 to inhibit leakage of the pressurized air.

In the present embodiment, the pressurized air introduced into the chamber 13 exerts a force that opposes the biasing force exerted by the biasing member 11. When the force exerted by the pressurized air in the chamber 13 exceeds the biasing force exerted by the biasing member 11, the first clutch member 35 moves axially away from the second clutch member 45 so that the first torque applying surface 38 and the first torque receiving surface 48 are no longer in the same plane. Accordingly, the first torque applying surface 38 is no longer configured to transmit torque to the first torque receiving surface 48 when the clutch 30 is disengaged. One or more stops 16 may be provided on the housing 21 to limit the axial movement of the first clutch member 35. Although in the presently preferred embodiment pressurized air is used to disengage the clutch, in alternative embodiments the clutch 30 may be disengaged by a solenoid.

Those of ordinary skill in the art will appreciate that the air bladder 110, in addition to raising or lowering the height of the seat 100, functions as a suspension system for the seat 100. Accordingly, while it may be desirable to allow an occupier to adjust the height of the seat 100, it is also desirable that the air bladder 110 not be over or under inflated, lest the shock absorption of the air bladder 110 be detrimentally affected. Advantageously, according to one aspect of the present embodiment, the clutch 30 is configured to prevent the air bladder 110 from being over and under inflated.

As shown in FIG. 6 and 7B, the first clutch member 35 is provided with at least one second torque applying surface 42. As shown, the first clutch member 35 is preferably provided with a plurality of second torque applying surfaces 42. Turning now to FIG. 7B, the second clutch member 45 of the present embodiment is provided with at least one second torque receiving surface 51 and at least one third torque receiving surface 52. As shown, the second clutch member 45 is preferably provided with a plurality of second torque receiving surfaces 51 and a plurality of third torque receiving surfaces 52. Advantageously, the second torque applying surfaces 42 cooperate with the second torque receiving surfaces 51 and the third torque receiving surfaces 52 to prevent the air bladder from being over or under inflated while the clutch 30 is disengaged by the height adjusting valve 120.

The second torque applying surfaces 42 on the first clutch member 35 and the second and third torque receiving surfaces 51, 52 on the second clutch member 45 are configured to allow limited relative rotation between the first clutch member 35 and the second clutch member 45, when the clutch 30 is disengaged. In this manner, the height adjusting valve 120 may adjust the height of the seat 100 according to a user's preference. In the present embodiment, however, the second torque applying surfaces 42 on the first clutch member 35 and the second and third torque receiving surfaces 51, 52 on the second clutch member 45 are configured so that a user may not inflate the air bladder 110 or deflate the air bladder 110 to such a degree that its ability to function as a suspension system for the seat 100 is significantly degraded. Accordingly, in the present embodiment, the second torque applying surfaces 42 contacts the second torque receiving surfaces 51 to limit relative rotation between the first and second clutch members 35, 45 as the first clutch member 35 rotates in a first direction, which in the present embodiment, is counter-clockwise. In the present embodiment, the second torque applying surfaces 42 contacts the third torque receiving surfaces 52 to limit relative rotation between the first and second clutch members 35, 45 as the first clutch member 35 rotates in a second direction, which in the present embodiment, is clockwise.

Accordingly, when an occupier of the seat seeks to increase or decrease the height of the seat 100, such as by activating the height adjustment valve 120, pressurized air is introduced into the fourth port 22 to disengage the clutch 30, as previously discussed. This, in turn, allows the height adjustment valve 120 to increase or decrease the amount of pressurized air in the air bladder 110, as previously discussed, which, in turn, increases or decreases the height of the seat 100. As the seat height is increased or decreased, the clutch arm 31 rotates the first member 35 of the clutch 30. Since the clutch 30 is disengaged, as this occurs, the first clutch member 35 rotates relative to the second clutch member 45 and the valve 70 is not actuated. The relative rotation may continue, however, until the second torque applying surfaces 42 on the first clutch member 35 contact either the second or third torque receiving surfaces 51, 52 on the second clutch member 45. Once contact occurs, the first clutch member 35 will rotate the second clutch member 45. This, in turn, will actuate the valve 70 into either the second or third position, whereat the leveling valve 20 will either inflate or deflate the air bladder 110, thereby counteracting the over or under inflation of the air bladder 110 resulting from activation of the height adjustment valve 120. Accordingly, the clutch 30 of the present embodiment is configured to protect the air bladder 110 from being over or under inflated by user activation of the height adjustment valve 120.

FIGS. 28-31 show the exit valve 150 of the present embodiment. The exit valve 150 may comprise a three-way valve. Numerous three-way valves suitable for use as an exit valve are known in the art; and seat height control system 10 of the present invention contemplates using other three-way valves. The details of the exit valve 150 of the present embodiment are intended to demonstrate one possible arrangement for allowing rapid deflation of the air bladder 110 in a seat height control system 10 that includes the leveling valve 20. Accordingly, it is within the scope of the present invention to utilize other three-way valves as an exit valve.

The exit valve 150 of the present embodiment is provided with a rocker 151, a cam portion 152, a rapid deflation valve 153, a first port 154, and a second port 155. In the present embodiment, the first port 154 connects to the second port 24 of the leveling valve 20, such as via conduit 2 (shown in FIG. 1). The second port 155 of the exit valve 150 connects to the air bladder 110, such as via conduit 6 (shown in FIG. 1). The first and second ports 154, 155 of the exit valve 150 are selectively connected via a pathway 159 that extends between the first and second ports 154, 155.

As shown in FIGS. 28 and 30, the rocker 151 may be depressed so that the rapid deflation valve 153 is in a first position or a second position. As shown in FIGS. 28 and 29, when the rapid deflation valve 153 is in the first position, the first port 154 is connected with the second port 155 via the pathway 159, which passes through a radial passage 156. Accordingly, in the first position, air may be delivered or removed from the air bladder in response to the valve 70 of the leveling valve 20 being actuated into either the second or third positions, as previously discussed.

As shown in FIGS. 30 and 31, when the rapid deflation valve 153 is in a second position, the rapid deflation valve 153 is depressed and blocks the pathway 159 between the first port 124 and the second port 155. Furthermore, when the rocker 151 is in the second position, a reduced diameter portion 157 on the rapid deflation valve 153 connects with the radial passage 156 and pressurized air in the bladder 110 may pass from the second port 155, the radial passage 156, and onto a vented region 158 located around the rapid deflation valve 153, via the reduced diameter portion 157. Accordingly, when the rapid deflation valve 153 is in a second position, the exit valve 150 relieves pressure from the air bladder 110. As the air bladder deflates, the valve 70 of the leveling valve 20 will actuate to the second position, whereat pressurized air will be delivered from the first port 23 to the second port 24 of the leveling valve 20. This pressurized air will then travel to the first port 154 of the exit valve, such as via conduit 2. However, since the rapid deflation valve 153 blocks the pathway 159 connecting the first port 154 with the second port 155, this pressurized air is not delivered to the air bladder 110 while the exit valve 150 is in the second position. Accordingly, the air bladder 110 will deflate and the height of the seat 100 will decrease, thereby allowing easier access to or easier removal from the seat 100. Once the exit valve 150 is returned to the first position, the leveling valve 20 will return the seat 100 to the height it was at prior to actuating the exit valve 150 into the second position.

The present description depicts specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. By way of example, and not limitation, those of ordinary skill in the art will appreciate that it is within the scope of the present invention to provide a clutch 30 that when engaged and a change in the height of the seat 100 occurs, the first clutch member 35 linearly actuates the second clutch member 45 to generally restore the height of the seat 100. By way of yet another example, and not limitation, those of ordinary skill in the art will appreciate that it is within the scope of the present invention to provide a clutch 30 and a valve 70 configured so that when the clutch 30 is engaged and a change in the height of the seat 100 occurs, the second clutch member 45 linearly actuates the valve 70 between first, second and third positions to generally restore the height of the seat 100. Furthermore, whereas, in the embodiment depicted, the height adjusting valve 120 functions to simultaneously disengage the clutch 30 and adjust the height of the seat 100, it is within the scope of the present invention to provide separate valves, one of which disengages the clutch 30, and another which adjusts the height of the seat 100 while the clutch 30 is disengaged. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other embodiments than those described above and shown in the accompanying figures. Accordingly, the scope of the invention is determined from the following claims.

We claim:

1. A leveling valve, comprising:
   a first port, a second port, and a third port;
   a valve; and
   a clutch that is provided with an engaged position and a disengaged position, wherein at least a portion of the clutch may move relative to the valve when the clutch is in the disengaged position and the clutch may move between a first rotational position, a second rotational position, and a third rotational position without moving the valve when the clutch is in the disengaged position, and wherein the clutch moves the valve when the clutch is in the engaged position;
   the valve being movable between the first rotational position, the second rotational position, and the third rotational position, with the third rotational position being achieved by rotation in a direction opposite to a rotational direction achieving the second rotational position, whereby:
      when the valve is in the first rotational position, the valve blocks a first pathway, which extends from the first port, from connecting with a second pathway, which extends from the second port;
      when the valve is in the second rotational position, the valve allows the first pathway to connect with the second pathway; and
      when the valve is in the third rotational position, the valve allows the second pathway to connect with a third pathway, which extends from the third port.

2. The leveling valve according to claim 1, wherein, when the valve is in the first rotational position, the valve blocks the second pathway from connecting with the third pathway.

3. The leveling valve according to claim 1, wherein, when the valve is in the third rotational position, the valve blocks the first pathway from connecting with the second pathway.

4. The leveling valve according to claim 1, wherein, when the valve is in the second rotational position, the valve blocks the second pathway from connecting with the third pathway.

5. The leveling valve according to claim 1, wherein, when the valve is in the first, second, or third rotational positions, the valve blocks the first pathway from connecting with the third pathway.

6. The leveling valve according to claim 1, wherein the clutch selectively moves the valve in a first direction from the first rotational position to the second rotational position or the clutch selectively moves the valve in a second direction from the first rotational position to the third rotational position.

7. A leveling valve, comprising:
   a first port from which a first pathway extends;
   a second port from which a second pathway extends;
   a third port from which a third pathway extends;
   a valve; and
   a clutch provided with a clutch arm, a first clutch member, and a second clutch member, wherein:
      the clutch arm is connected to the first clutch member and moves the first clutch member when the clutch is in an engaged position and a disengaged position, wherein the clutch may move between a first rotational position, a second rotational position, and a third rotational position without moving the valve when the clutch is in the disengaged position;
      the first clutch member moves the second clutch member when the clutch is in the engaged position;
      the first clutch member may move relative to the second clutch member when the clutch is in the disengaged position;
      the second clutch member moving the valve between the first rotational position, the second rotational position, and the third rotational position when the first clutch member moves the second clutch member, with the third rotational position being achieved by rotation in a direction opposite to a rotational direction achieving, the second rotational position, whereby:
         when the valve is in the first rotational position, the valve blocks the first pathway from connecting with the second pathway;

when the valve is in the second rotational position, the valve allows the first pathway to connect with the second pathway; and when the valve is in the third rotational position, the valve allows the second pathway to connect with the third pathway.

8. The leveling valve according to claim 7, wherein, when the valve is in the first rotational position, the valve blocks the second pathway from connecting with the third pathway.

9. The leveling valve according to claim 7, wherein, when the valve is in the third rotational position, the valve blocks the first pathway from connecting with the second pathway.

10. The leveling valve according to claim 7, wherein, when the valve is in the second rotational position, the valve blocks the second pathway from connecting with the third pathway.

11. The leveling valve according to claim 7, wherein, when the valve is in the first, second, or third rotational positions, the valve blocks the first pathway from connecting with the third pathway.

12. The leveling valve according to claim 7, wherein the clutch selectively moves the valve in a first direction from the first rotational position to the second rotational position or the clutch moves the valve in a second direction from the first rotational position to the third rotational position.

* * * * *